United States Patent
Sato

(10) Patent No.: US 8,852,697 B2
(45) Date of Patent: Oct. 7, 2014

(54) CELLULOSE ACETATE FILM, AND POLARIZING PLATE AND LIQUID CRYSTAL DISPLAY DEVICE WHICH ARE MADE USING SAME

(75) Inventor: Hideyuki Sato, Hyogo (JP)

(73) Assignee: Konica Minolta Advanced Layers, Inc., Tokyo (JP)

(*) Notice: Subject to any disclaimer, the term of this patent is extended or adjusted under 35 U.S.C. 154(b) by 0 days.

(21) Appl. No.: 13/641,855

(22) PCT Filed: Apr. 4, 2011

(86) PCT No.: PCT/JP2011/058519
§ 371 (c)(1),
(2), (4) Date: Oct. 17, 2012

(87) PCT Pub. No.: WO2011/135980
PCT Pub. Date: Nov. 3, 2011

(65) Prior Publication Data
US 2013/0045340 A1    Feb. 21, 2013

(30) Foreign Application Priority Data

Apr. 28, 2010  (JP) ................................. 2010-103260

(51) Int. Cl.
*G02F 1/13363* (2006.01)
*C08L 1/12* (2006.01)
*C08K 5/151* (2006.01)
*C08J 5/18* (2006.01)
*G02B 5/30* (2006.01)

(52) U.S. Cl.
CPC .............. *C08J 5/18* (2013.01); *G02F 1/13363* (2013.01); *G02B 5/3033* (2013.01); *C08J 2301/12* (2013.01); *C08K 5/151* (2013.01); *C08L 1/12* (2013.01)
USPC .............................. 428/1.33; 349/96; 349/118

(58) Field of Classification Search
CPC ........ C08K 5/151; C08L 1/12; C08J 2301/12; G02B 5/3033; G02B 5/3083; G02F 1/13363
USPC ............. 428/1.3–1.33; 349/96, 122, 117–118
See application file for complete search history.

(56) References Cited

U.S. PATENT DOCUMENTS

2006/0257589 A1* 11/2006 Hayashi et al. ................. 428/1.2
2009/0244705 A1* 10/2009 Takeda et al. ................. 359/507
2010/0188622 A1*  7/2010 Suzuki et al. .................. 349/96

FOREIGN PATENT DOCUMENTS

| EP | 0911656 | 1/2005 |
| JP | 2006-265301 | 10/2006 |
| JP | 2008-183849 | 8/2008 |
| JP | 2011-094098 | 5/2011 |
| WO | WO 2009011229 A1 * | 1/2009 |
| WO | 2009/060743 | 5/2009 |
| WO | 2011/040333 | 4/2011 |

OTHER PUBLICATIONS

JPO Machine English Translation of JP 2006-265301, Nozoe et al., Oct. 5, 2006.*
JPO Machine English Translation of JP 2000-351871, Nakada et al., Dec. 19, 2000.*
Korean Office Action, Application No. 10-2012-702703, Date of Mailing: Feb. 26, 2014 with English translation (total of 6 pages).

* cited by examiner

*Primary Examiner* — Sophie Hon
(74) *Attorney, Agent, or Firm* — Lucas & Mercanti, LLP

(57) ABSTRACT

Provided is a cellulose acetate film which has excellent retardation properties and exhibits low haze even under high-temperature and high-humidity conditions and which, in an alkaline saponification step, causes little dissolution of the film itself or additives in a saponifying liquid. The cellulose acetate film is characterized by comprising: a cellulose acetate which has an acetyl substitution degree of 2.0 to 2.5; and 5 to 15% by mass (relative to the cellulose acetate) of a component which contains a compound represented by general formula (1) wherein m is 0 and a compound represented thereby wherein in is more than 0 at a ratio of 45:55 to 0:100. In general formula (1), G is a mono- or di-saccharide residue; $X^1$ is —O—; $R^1$ is —CO—$R^2$; $R^2$ is an aliphatic or aromatic group; m represents the total number of hydroxyl groups directly bonded to the mono- or di-saccharide residue; and n represents the total number of $OR^1$ groups directly bonded to the mono- or di-saccharide residue, with the proviso that m and n satisfy fee relationships: $3 \le m+n \le 8$ and n is not 0.

5 Claims, No Drawings

CELLULOSE ACETATE FILM, AND POLARIZING PLATE AND LIQUID CRYSTAL DISPLAY DEVICE WHICH ARE MADE USING SAME

CROSS REFERENCE TO RELATED APPLICATION

This Application is 371 of PCT/JP2011/058519 filed on Apr. 4, 2011 which, in turn, claimed the priority of Japanese Patent Application No 2010-103260 filed on Apr. 28, 2010, both applications are incorporated by reference herein.

TECHNICAL FIELD

The present invention relates to a cellulose acetate film, and a polarizing plate and a liquid crystal display device using the same.

BACKGROUND OF THE INVENTION

Among cellulose esters, cellulose acetate is known to be capable of application to optical films having a wide range of retardation values by varying its acetyl substitution degree. In general speaking, a triacetyl cellulose film having a high acetyl substitution degree has been preferably used as a protective film of a polarizing plate because of its low retardation. However, when a cellulose acetate film is used as an optical compensation film for various liquid crystal modes such as a VA mode or a TN mode, it has been necessary to add a retardation increasing agent since the retardation had been insufficient (for example, refer to Patent Document 1).

Since diacetyl cellulose having a lower acetyl substitution degree has a higher ability to provide a larger retardation value, it can be expected to be used as an optical compensation film without adding a retardation increasing agent. However, a cellulose resin having a lower acetyl substitution degree exhibits a higher moisture permeability due to its too high hydrophilic nature. Accordingly, it has been difficult to use diacetyl cellulose as a polarizing plate protective film as it is. Also, there has been a problem that a part of the film is dissolved into a saponofication liquid in the alkaline saponification step in the polarizing plate manufacturing process.

A technique to add a saccharide ester (sugar ester) compound into a cellulose acylate film for the purpose of reducing the moisture permeability has been, disclosed (for example, refer to Patent Document 2). However, in the above technique, it is expected be applied for a cellulose acylate film having an acetyl substitution degree of 2.6 or more, and, when the technique is applied for a diacetyl cellulose having further lower acetyl substitution degree, there has been a problem that haze of the film is increased. Accordingly, improvement has been desired.

PRIOR ART DOCUMENTS

Patent Documents

Patent Document 1; European patent No. 911656
Patent Document 2: Japanese Patent Application Publication Open to Public Inspection (hereafter referred to as JP-A) No. 2006-265301

SUMMARY OF THE INVENTION

Problems to be Solved by the Invention

Accordingly, an object of the present invention is to provide a cellulose acetate film exhibiting an excellent retardation generating nature, reduced haze under a high temperature and high humidify condition, and reduced dissolving nature of the cellulose acetate film itself and the additive into an alkaline saponification liquid in an alkaline saponification process, and a polarizing plate and a liquid crystal display device employing the same.

Means to Solve the Problems

The above object of the present invention is achieved by the following structures.

1. A cellulose acetate film comprising a cellulose acetate having an acetyl substitution degree of 2.0 to 2.5 and at least one compound having a structure represented by Formula (1) and having a mixing ratio of a component exhibiting m=0:a component exhibiting m>0 of 45:55 through 0:100, a content of the compound being 5 to 15% by mass based on the mass of cellulose acetate, $$(HO)_m\text{-}G\text{-}(X^1\text{—}R^1)_n \quad \text{Formula (1)}$$

wherein

G represents a residue of a mono- or di-saccharide, $X^1$ represents —O—, $R^1$ represents —CO—$R^2$, $R^2$ represents an aliphatic group or an aromatic group, m represents a total number of a hydroxyl group directly bonded to the mono- or di-saccharide, n represents a total number of $OR^1$ group directly bonded to the mono- or di-saccharide, $3 \leq m+n \leq 8$, aid n is not zero.

2. The cellulose acetate film of Item 1, wherein the cellulose acetate film comprises 5 to 15% by mass based on the mass of the cellulose ester of a compound represented by Formula (1) and exhibiting an average log P value of 7.5 or more.

3. The cellulose acetate film, of Item 1 or 2, wherein the mono- or di-saccharide represented by G in Formula (1) is a pyranose ring, a furanose ring or both of the pyranose ring and the furanose ring.

4. A polarizing plate having the cellulose acetate film of any one of Items 1 to 3 on at least one surface of a polarizer.

5. A liquid crystal display device having the polarizing plate of Item 4 on at least one surface of a liquid crystal cell.

Effect of the Invention

According to the present invention, a cellulose acetate film exhibiting an excellent retardation generating property, reduced haze under a high temperature and high humidity condition, and reduced dissolving nature of the cellulose acetate film itself and the additive into an alkaline saponification liquid in an alkaline saponification process, and a polarizing plate and a liquid crystal display device employing the same can be provided.

EMBODIMENTS TO CARRY OUT THE INVENTION

The embodiments to carry out the present invention will be explained in detail below, however, the present invention is not limited thereto.

The cellulose acetate film of the present invention is characterized in that the cellulose acetate film contains a cellulose acetate having an acetyl substitution degree of 2.0 to 2.5, and at least one compound having a structure represented by Formula (1) and having a mixing ratio of a component exhibiting m=0:a component exhibiting m>0 of 45:55 through 0:100, a content of the compound being 5 to 15% by mass based on the mass of cellulose acetate.

A compound having a structure represented by Formula (1) (hereafter, also referred to as a saccharide ester compound) has been known as a moisture permeability reducing agent of a cellulose acylate (refer to aforementioned Patent Document 1). In Patent Document 1, disclosed is a technique in which a low moisture permeability is achieved by applying the compound to a cellulose acylate film of which acetyl substitution degree in 2.6 or more. For the purpose of improving the moisture permeation property, the substitution degree of a saccharide ester is preferably higher.

On the oilier hand, in the process of examining the application of the aforementioned technique to a diacetyl cellulose of which acetyl substitution degree is 2.5 or less, there happened a new problem that the haze of the film increases under a high temperature-high humidity addition, thus, practically, there occurred necessity of a new examination.

As the results of the intensive examination by the present inventors on the problem of the increase in haze, it was found that the haze of the film under a high temperature-high humidity condition is increased when a fully esterified saccharide ester component, namely, m=0, is contained with more than a certain amount in a cellulose acetate having an acetyl substitution degree of 2.0-2.5.

Further, in view of the function and cost, it was found that a cellulose acetate film exhibiting an excellent retardation generating function, low haze under a high temperature-high humidity condition and low solubilities of the film itself and an additive into an alkai saponification liquid in an alikali saponification process can be obtained by a constitution containing a cellulose acetate having an acetyl substitution degree of 2.0 to 2.5, and at least one compound having a structure represented by Formula (1) and having a mixing ratio of a component exhibiting m=0:a component exhibiting m>0 of 45:55 through 0:100, a content of the compound being 5 to 15% by mass based on the mass of cellulose acetate.

<Cellulose Acetate>

As a cellulose acetate film of the present invention, in view of obtaining a film capable of forming a thin film and reducing the stretching ratio conducted to generate retardation, even when the film is a retardation film having a high retardation providing function to exhibit a high retardation value, employed is a film containing a cellulose acetate having an acetyl substitution degree of 2.0 to 2.5. The acetyl substitution degree cars be determined according to the method of ASTM D-817-91.

The acetyl substitution degree is preferably from 2.2 to 2.45.

The weight average molecular weight of the cellulose acetate used in the present invention is not specifically limited, however, the cellulose acetate is preferably Cellulose acetate (A) having a weight average molecular weight of 150000 or more but 250000 or less, since it is capable of obtaining a thin film. Further, in addition to the aforementioned Cellulose acetate (A), Cellulose acetate (B) having a weight average molecular weight of 100000 or more but 150000 or less may be mixed.

The mixing ratio of above (A) and (B) is preferably (A):(B)=100:0 through 50:50, and more preferably (A):(B)=100:0 through 80:20.

The weight average molecular weight Mw of the cellulose acetate was determined using Gel Permeation Chromatography (GPC).

The measurement condition will be shown below.
Solvent: Methylene chloride
Column: Shodex K806, K805, K803G (produced by Showa Denko K.K., 3 columns are connected to use)
Column temperature: 25° C.
Sample concentration: 0.1% by mass
Detector: RI Model 504 (produced by GL Sciences Inc.)
Pump: L6000 (produced by Hitachi Ltd.)
Flow rate: 1.0 ml/min
Calibration curve: Standard polystyrene STK (produced by Tosoh Corp.), a calibration curve obtained by using 13 samples in the Mw ranges of 1000000 to 500 is used. The 13 samples are of approximately the same intervals.

The cellulose acetate of the present invention can be synthesized via a method well known in the art.

Cellulose as a starting material of the cellulose acetate is not specifically limited, and includes such as cotton tinier, wood pulp (obtained from broad leaf trees and needle leaf trees) and kenaf. Further, cellulose acetate prepared from these materials may be utilized by mixing each of them at an arbitrary ratio.

The cellulose acetate according to the present invention can be manufactured according to a known method. Specifically, the cellulose ester can be synthesized by referring the method described in JP-A No. 10-54804.

Examples of a commercialized product include L20, L30, L40 and L50 manufactured by Daicel Corporation, and Ca398-3, Ca398-6, 0398-10, Ca398-30, Ca394-60S manufactured by Eastman Chemical Company.

<Compound represented by Formula (1)>

The cellulose acetate film of the present invention is characterized in that at least one compound having a structure represented by Formula (1) and having a mixing ratio of a component exhibiting m=0; a component exhibiting m>0 of 45:55 through 0:100 is contained in an amount of 5 to 15% by mass based on the mass of cellulose acetate.

$$(HO)_m\text{-}G\text{-}(X^1\text{---}R^1)_n \qquad \text{Formula (1)}$$

(in the formula, G represents a residue of a mono- or di-saccharide, $X^1$ represents —O—, $R^1$ represents —CO—$R^2$, $R^2$ represents an aliphatic group or an aromatic group, m represents a total number of hydroxyl groups directly bonded to the mono- or di-saccharide, n represents a total number of $OR^1$ groups directly bonded to the mono- or di-saccharide, $3 \leq m+n \leq 8$, and n is not zero.)

With respect to a compound represented by Formula (1), it has been known that the synthesis of a single variety compound hi which the number of a hydroxyl group (m) and the number of $OR^1$ group (n) are fixed is difficult, and that a compound in which several kinds of components having different m, n values can be obtained. Accordingly, the property of a mixed substance in which the number of a hydroxyl group (m) and the number of $OR^1$ group (n) are individually varied should be considered. The present inventors have found mat the haze of the film is largely influenced when a fully esterified saccharide ester component, namely, m=0, is contained in more than a certain amount. Accordingly, the mixing ratio of die component exhibiting m=0 and the component exhibiting m>0 was determined.

Therefore, the effect of the present invention is achieved when the compound has a mixing ratio of the component exhibiting m=0:the component exhibiting m>0 of in the range of 45:55 to 0:100. Further, in view of the function and the cost, the mixing ratio of the component exhibiting m=0:the component exhibiting m>0 is more preferably in the range of 30:70 to 0:100. Most preferably, the mixing ratio of the component exhibiting m=0:the component exhibiting m>0 is in the range of 10:90 to 0:100.

The components exhibiting m=0 and m>0 can be measured by using a high speed liquid chromatography according to a common method.

In above Formula (1), G represents a residue of a mono- or di-saccharide. Examples of a mono-saccharide include allose, altrose, glucose, mannose, gulose, idose, galactose, talose, ribose, arabinose, xylose and lyxose.

In the following, structural examples of a compound having a residue of a mono-saccharide represented by Formula (1) will be shown, however, the present invention is not limited these specific examples.

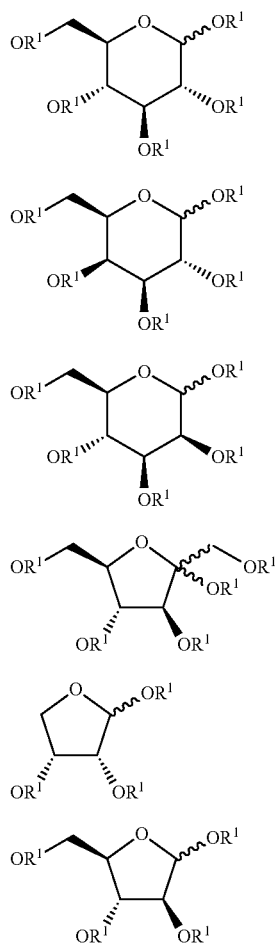

Examples of a di-saccharide include trehalose, sucrose, maltose, cellobiose, gentiobiose, lactose and isotrehalose.

In the following, structural examples of a compound having a residue of a di-saccharide represented by Formula (1) will be shown, however, the present invention is not limited these specific examples.

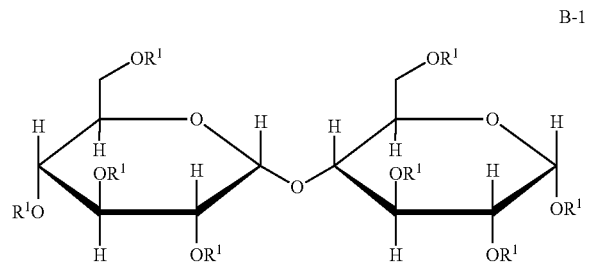

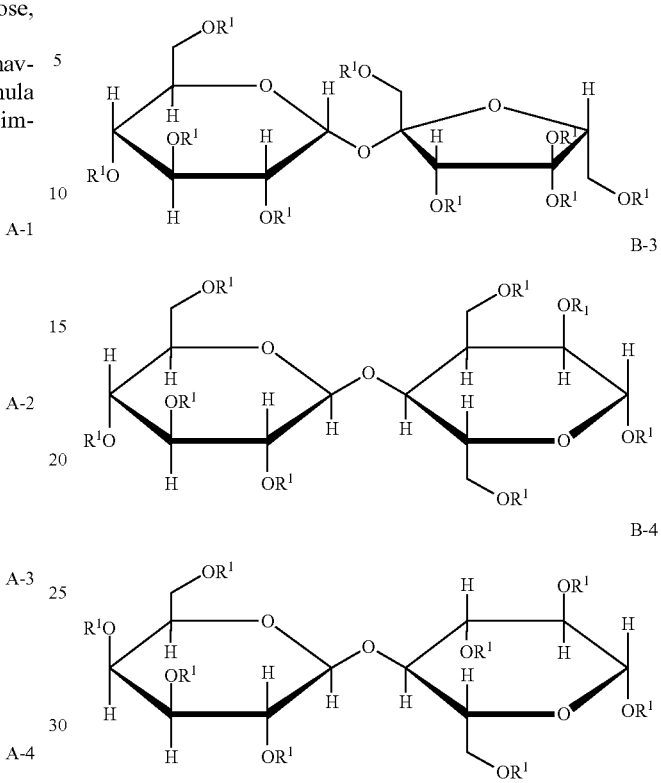

In the structure represented by Formula (1), $X^1$ represents a bond or —O—, $R^1$ represents —CO—$R^2$ and $R^2$ represents an aliphatic group or an aromatic group. The aliphatic group and fee aromatic group each independently may have a substituent.

m represents a number of hydroxyl group, n represents a number of $OR^1$ group, wherein it is necessary that $3 \leq m+n \leq 8$, and it is preferable that $4 \leq m+n \leq 8$. n is not zero. When n is 2 or more, —$X^1$—$R^1$ may be the same or different from each other.

The aforementioned aliphatic group will be explained below. The aliphatic group may be of a linear chain, a branched chain or a circle. The number of carbon atoms is preferably 1 to 25, more preferably 1 to 20, and specifically preferably 2 to 15. Examples of an aliphatic group include methyl, ethyl, n-propyl, iso-propyl, cyclo propyl, n-butyl, isobutyl, tert-butyl, amyl, iso-amyl, tert-amyl, n-hexyl, cyclohexyl, n-heptyl, n-octyl, bicyclooctyl, adamantyl, n-decyl, tert-octyl, dodecyl, hexadecyl, octadecyl and didecyl.

The aforementioned aromatic group will be explained below. The aromatic group may be an aromatic hydrocarbon group or a aromatic hetercycle group, and more preferably a aromatic hydrocarbon group. As an aromatic hydrocarbon group, preferable is one having 6 to 24 carbon atoms, and more preferable is one having 6 to 12 carbon atoms. Specific examples of an aromatic hydrocarbon group include benzene, naphthalene, anthrathene, biphenyl and terphenyl. As an aromatic heterocycle group, preferable is one containing at least one of an oxygen atom, a nitrogen atom and a sulfur atom. Examples of an heterocycle ring include furan, pyrrole, thiophene, imidazole, pyrazole, pyridine, pyrazine, pyridazine, triasole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole and tetraaza indene. As an aromatic heterocycle group, pyridine, triazine and quinoline are specifically preferable.

Next, preferable examples of a compound represented by Formula (1) will be shown below, however, the present invention is not limited thereto.

Compounds 5

| Compound name | Sugar residue | Substituent 1 ($OR^1$ group) Structure | Substitution degree (n) | Substituent 2 (hydroxyl group) Structure | Substitution degree (m) | logP |
|---|---|---|---|---|---|---|
| a1 | B-2 | 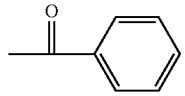 | 8 | —H | 0 | 13.9 |
| a2 |  |  | 7 |  | 1 | 11.8 |
| a3 |  |  | 6 |  | 2 | 9.8 |
| a4 |  |  | 5 |  | 3 | 7.7 |
| b1 | A-1 |  | 5 | —H | 0 | −1.1 |
| b2 |  |  | 4 |  | 1 | −1.2 |
| b3 |  |  | 3 |  | 2 | −1.4 |
| b4 |  |  | 2 |  | 3 | −1.5 |
| c1 | B-1 |  | 8 | —H | 0 | 17.1 |
| c2 |  |  | 7 |  | 1 | 14.6 |
| c3 |  |  | 6 |  | 2 | 12.1 |
| c4 |  |  | 5 |  | 3 | 9.6 |
| d1 | A-5 |  | 3 | —H | 0 | 2.8 |
| d2 |  |  | 2 |  | 1 | 1.6 |
| d3 |  |  | 1 |  | 2 | 0.3 |
| e1 | A-1 | 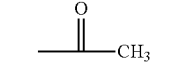 | 5 | —H | 0 | 8.2 |
| e2 |  |  | 4 |  | 1 | 6.1 |
| e3 |  |  | 3 |  | 2 | 4.2 |
| e4 |  |  | 2 |  | 3 | 2.2 |

Compounds 6

| Compound name | Sugar residue | Substituent 1 ($OR^1$ group) Structure | Substitution degree (n) | Substituent 2 (hydroxyl group) Structure | Substitution degree (m) | logP |
|---|---|---|---|---|---|---|
| f1 | B-2 |  | 8 | —H | 0 | −1.4 |
| f2 |  |  | 7 |  | 1 | −1.6 |
| f3 |  |  | 6 |  | 2 | −1.7 |
| f4 |  |  | 5 |  | 3 | −1.8 |
| g1 | B-2 |  | 8 |  | 0 | 8.1 |
| g2 |  |  | 7 |  | 1 | 6.9 |
| g3 |  |  | 6 |  | 2 | 5.7 |
| g4 |  |  | 5 |  | 3 | 4.5 |

Synthesis Example

Synthesis of Compound of the Present Invention

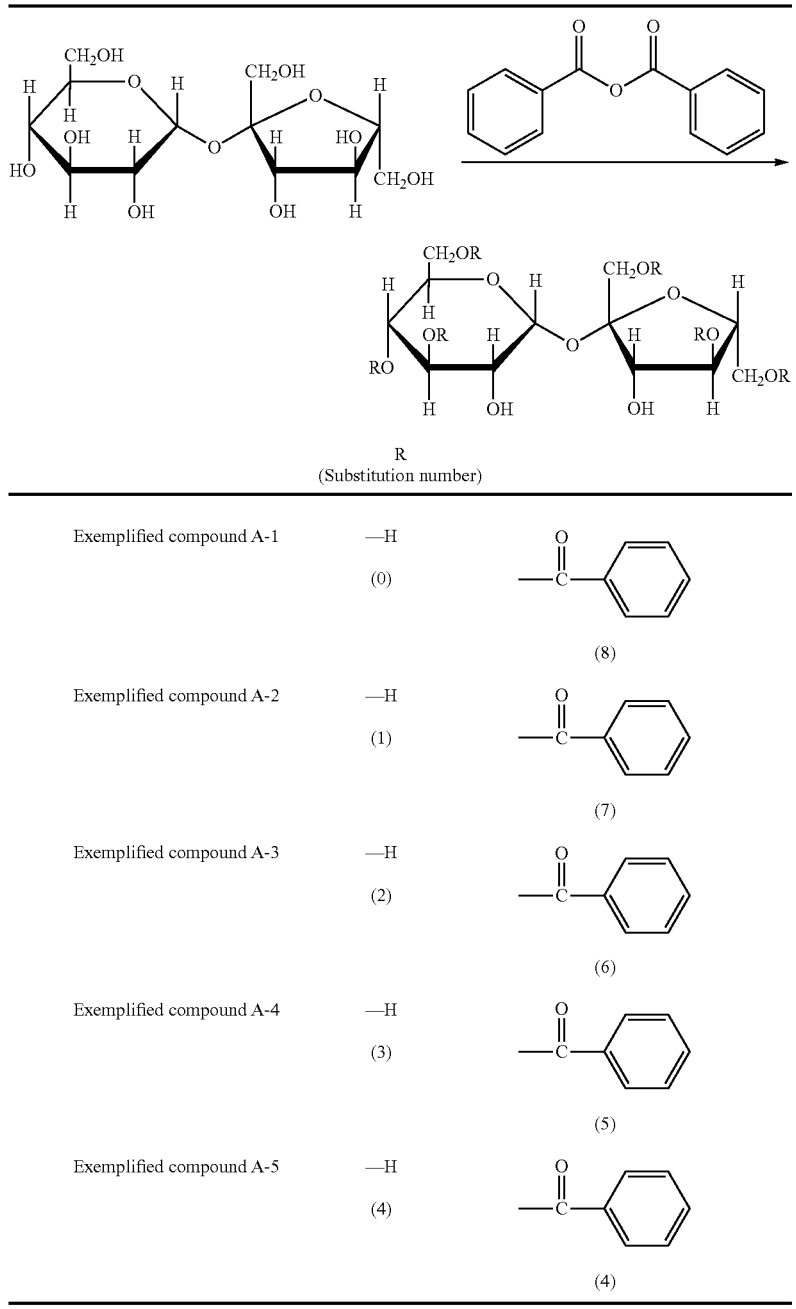

A four-necked flask equipped with a stirrer, a reflux condenser, a thermometer and a nitrogen gas introducing tube was charged with 34.2 g (0.1 mol) of saccharose, 135.6 g (0.6 mol) of benzoic acid anhydride and 284.8 g (3.6 mol) of pyridine, and the temperature was raised with stirring while introducing a nitrogen gas through the nitrogen gas introducing tube to conduct an esterification reaction at 70° C. for 5 hours.

Next, after the inside of the flask was evacuated to a pressure of not higher than $4 \times 10^2$ Pa to eliminate excess pyridine by evaporation at 60° C., the inside of the flask, was evacuated to a pressure of not higher than $1.3 \times 10$ Pa and a temperature of 120° C. to eliminate the most, part of benzoic acid anhydride and generated benzoic acid by evaporation. Then, 1 L of toluene and 300 g of a 0.5 mass % sodium carbonate aqueous solution were added, and after stirring at 50° C. for 30 minutes, the system was left standing to take out the toluene layer. Finally, the toluene layer taken out was added with 100 g of water, and the toluene layer was taken out after washing at ordinary temperature for 30 minutes, toluene being eliminated by evaporation at 60° C. under a reduced pressure snot higher than $4 \times 10^2$ Pa), whereby a mixture of, for example, compounds A-1, A-2, A-3, A-4 and A-5 was obtained. The prepared mixture was analyzed by using a high pressure liquid chromatography (HPLC-MS) and fee formation of 1.2 mass % of A-1, 13.2 mass % of A-2, 14.2 mass % of A-3, 35.4 mass % of A-4 and 40.0 mass % of A-5 was observed.

By purifying a part, of the obtained mixture with column chromatography using silica gel, A-1, A-2, A-3, A-4 and A-5, each purity of which was 100%, were obtained.

<Octanol-Water Distribution Coefficient (Log P)>

The cellulose acetate film of the present invention is a compound represented by Formula (1), and preferably contains from 5 to 17 mass % based on the mass of the cellulose acetate of a compound having an average log P value of 7.5 or more.

The aforementioned compound having an average log P value of 7.5 or more has an effect to suppress the dissolution of fee cellulose acetate film of fee present invention into an alkaline saponification liquid.

Since the compound represented by Formula (1) is a compound which may have a combination of different m values which represent the number of hydroxyl groups and n values which represent, the number of $OR^1$ groups, the average log P value means an average value of log P values of the compounds each has a structure having a combination of individual m and n values by considering the mixing ratio (in mass ratio). For example, the log P value of each of a 1 through a4 in Compounds 5 is determined, and the average log P value is determined to be log P=11.9 when the mixing ratio of the compounds represented by Formula (1) is a1/a2/a3/a4=43/27/20/10.

The measurement of octanol-water distribution coefficient can be performed by the flask shaking method described in JIS Z 7260-107 (2000). The octanol-water distribution coefficient (log P value) can be estimated by a chemical computational method or an experimental method in stead of the actual measurement.

As a computational method, Crippen's tragmentation method (J. Chem. Inf. Comput. Sci., 27, 23 (1987)), Viswanadhan's fragmentation method (J. Chem. Inf. Comput. Sci., 29,163 (1989)), Broto's fragmentationmethod (Eur. J. Med. Chem.-Chim. Theor., 19, 71 (1984) and ClogP method (Reference document; Leo, A., Jow, P. Y. C, Sffipo, C. Hansen, C. J. Med., Chem. 18,865 1975) are preferably applicable, and Crippen's fragmentation method (J. Chem. Inf. Comput. Sci., 27, 21 (1987)) is more preferable.

<Other Additives>

In me cellulose acetate film, according to the present invention, it is preferable that an ester compound represented by following Formula (2) is contained as a plasticizer, in view of obtaining dimensional stability in varied environment, which may affect the unevenness of a polarizing plate.

B-(G-A)$n$-G-B    Formula (2)

(in the formula, B represents a hydroxyl group or a carboxylic acid residue; G represents an alkylene glycol residue having 2 to 12 carbon atoms, an aryl glycol residue having 6 to 1.2 carbon atoms, or an oxyalkylene glycol residue having 4 to 12 carbon atoms; A represents an alkylene dicarboxylic acid residue having 4 to 12 carbon atoms or an aryldicarboxylic acid residue having 6 to 12 carbon atoms; and n represents an integer of at least 1.)

In Formula (2), examples of an alkylene glycol component having 2 to 12 carbon atoms include: ethylene glycol, 1,2-propylene glycol, 1,3-propylene glycol 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentylglycol), 2,2-diethyl-1,3-propanediol (3,3-dimethylol pentane), 2-n-butyl-2-ethyl-1,3-propanediol (3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol, which may be used alone or in combination of two or more glycols.

An alkylene glycol having 2 to 12 carbon atoms is specifically preferred due to its excellent compatibility with cellulose acetate.

Examples of art aryl glycol component having 6 to 12 carbon atoms include hydroquinone, resorcin, bisphenol A, bisphenol F and bisphenol, which may be used alone or in combination of two or more glycols.

Examples of an oxyalkylene glycol component having 4 to 12 carbon atoms include: diethylene glycol, methylene glycol, tetraethylene glycol, dipropylene glycol and tripropylene glycol, which may be used alone or in combination of two or more glycols.

Examples of an alkylene dicarboxylic acid component, having 4 to 12 carbon atoms include: succinic acid, maleic acid, the fumaric acid, glutaric acid, adipic acid, azelaic acid, sebacic acid and dodecane dicarboxylic acid, which may be used alone or in combination of two or more acids. Examples of an aryl dicarboxylic acid component having 6 to 12 carbon atoms include: phthalic acid, terephthalic acid, isophthalic acid, 1,5-naphthalene dicarboxylic acid and 1,4-naphthalene dicarboxylic acid.

The number average molecular weight of the ester compound represented by Formula (2) is preferably in the range of 300 to 1500, and more preferably in the range of 400 to 1000.

Further, in the cellulose acetate film, according to the present invention, a polyester compound having hydroxyl groups at the terminals is preferably used in view of obtaining an excellent compatibility.

Specific examples of an ester compound represented by Formula (2) of the present invention will be shown below, however, the present invention is not limited thereto.

2-1

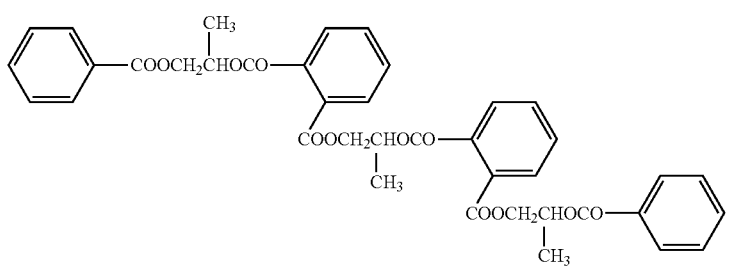

Mw: 696

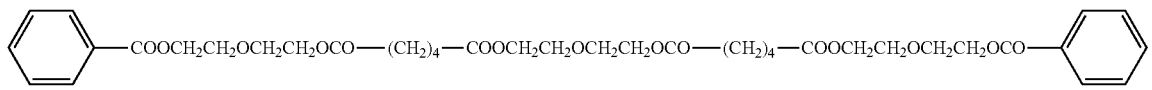
Mw: 746
2-2
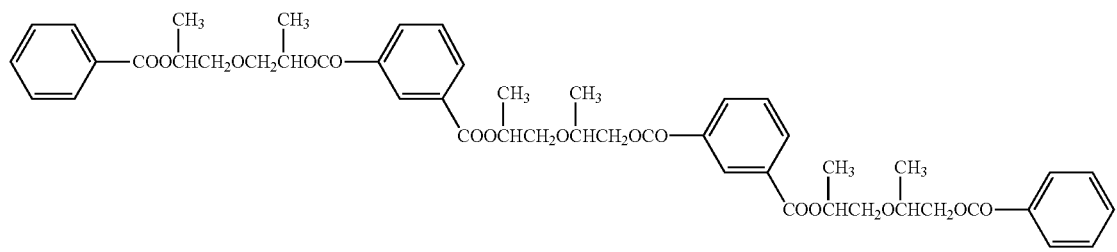
Mw: 830
2-3
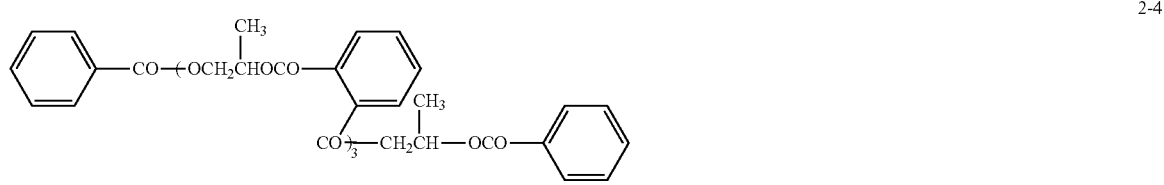
Mw: 886
2-4
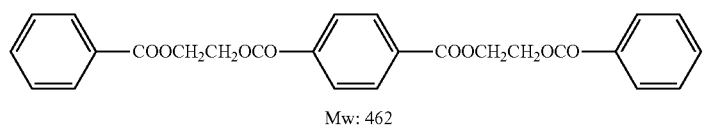
Mw: 462
2-5
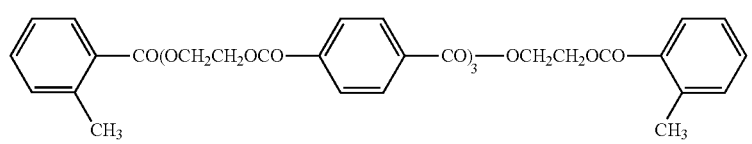
Mw: 874
2-6
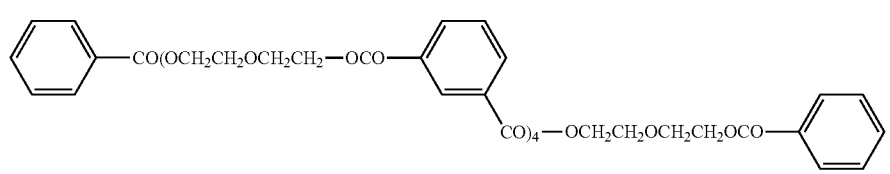
Mw: 1258
2-7
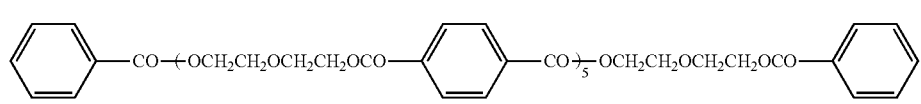
Mw: 1494
2-8
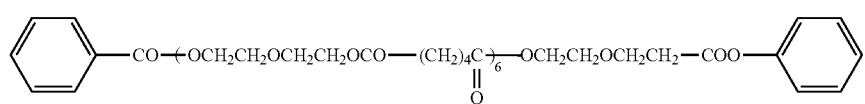
Mw: 1394
2-9

-continued
2-10
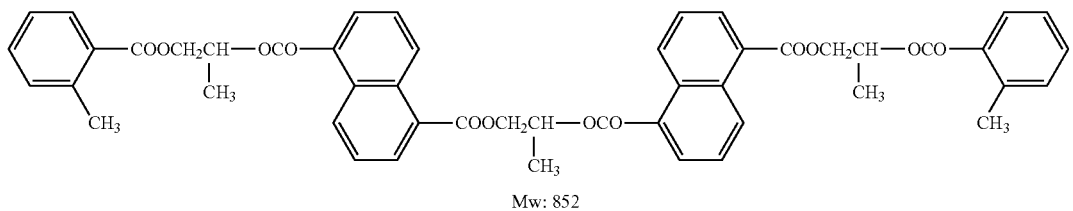
Mw: 852
2-11
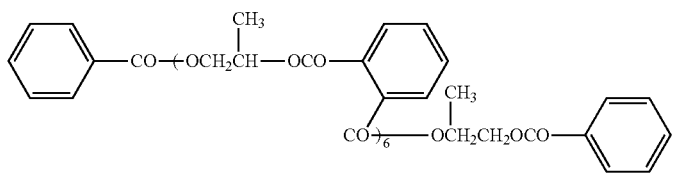
Mw: 1314
2-12
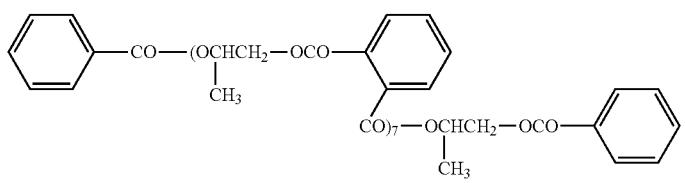
Mw: 1726
2-13
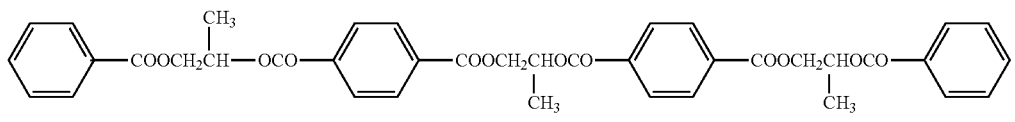
Mw: 696
2-14
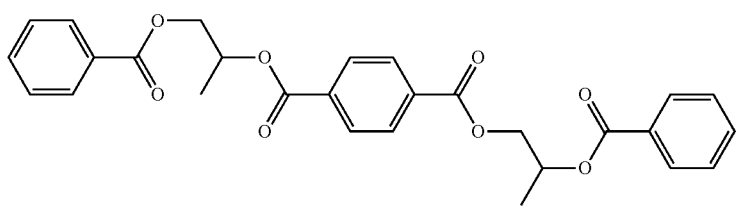
Mw: 491
2-15
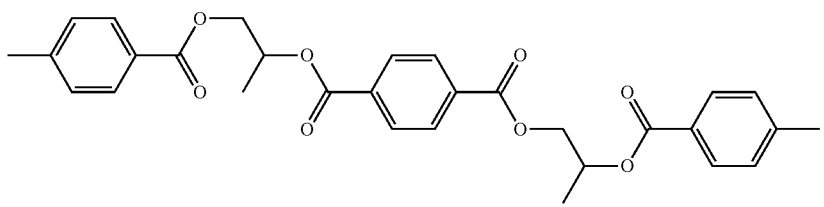
Mw: 519
2-16
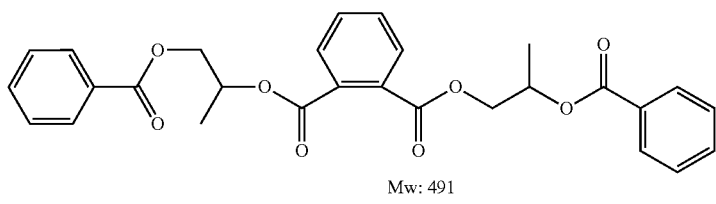
Mw: 491

-continued
2-17
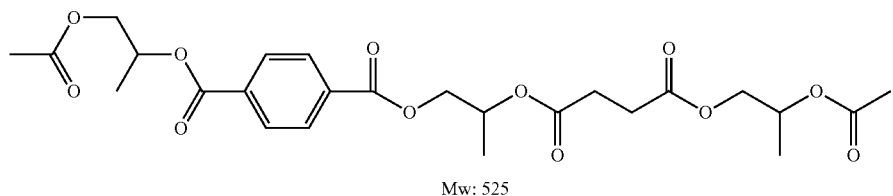
Mw: 525
2-18
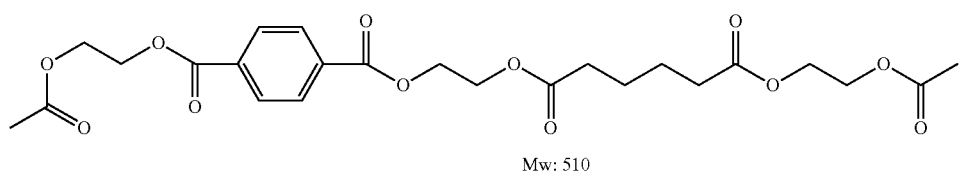
Mw: 510
2-19
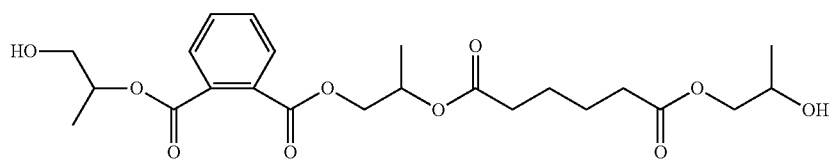
Mw: 469
2-20
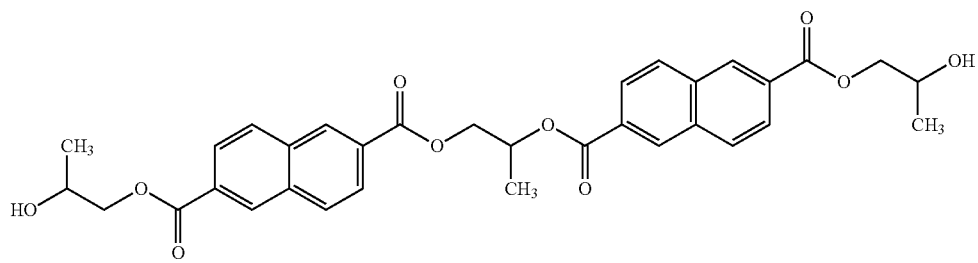
Mw: 589
2-21
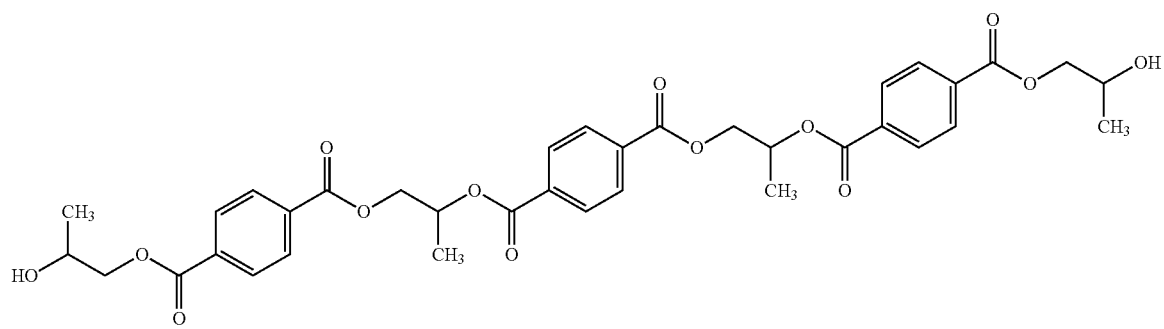
Mw: 695
2-22
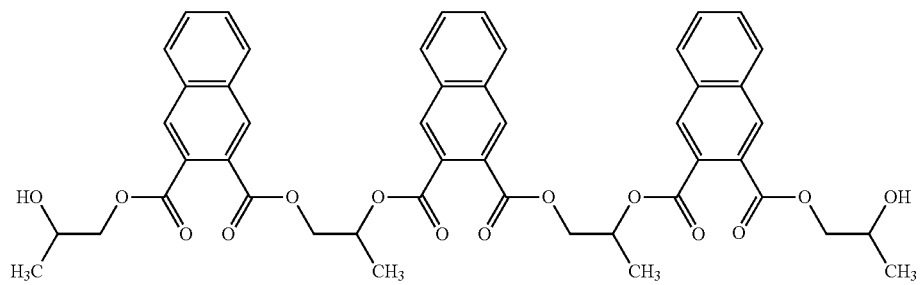
Mw: 845

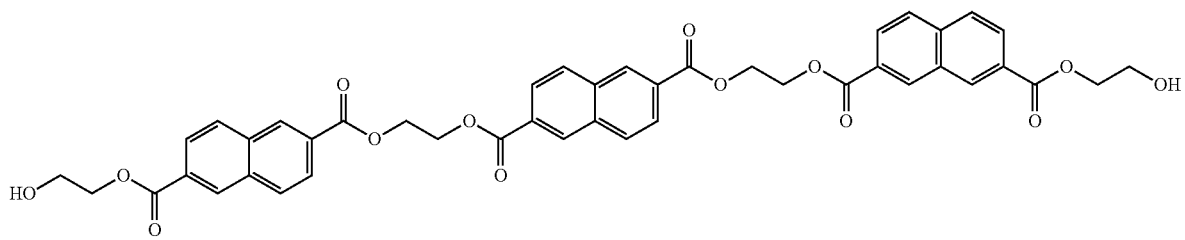

2-23

Mw: 789

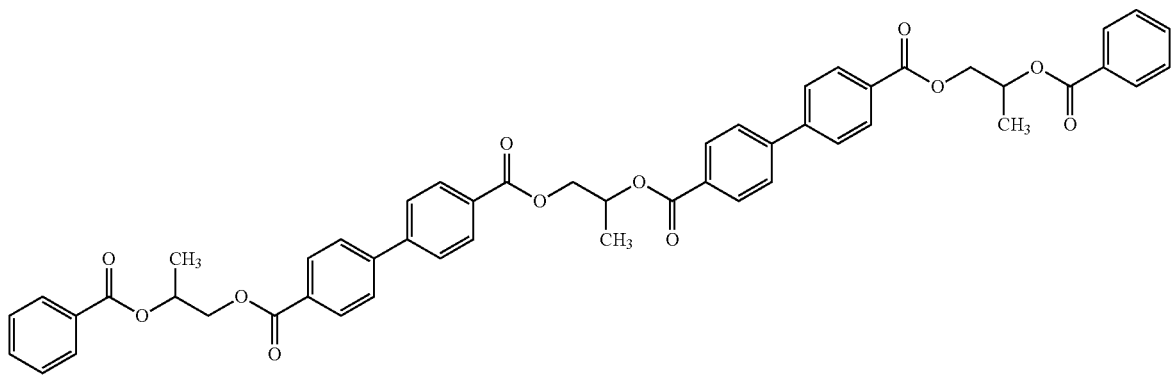

2-24

Mw: 849

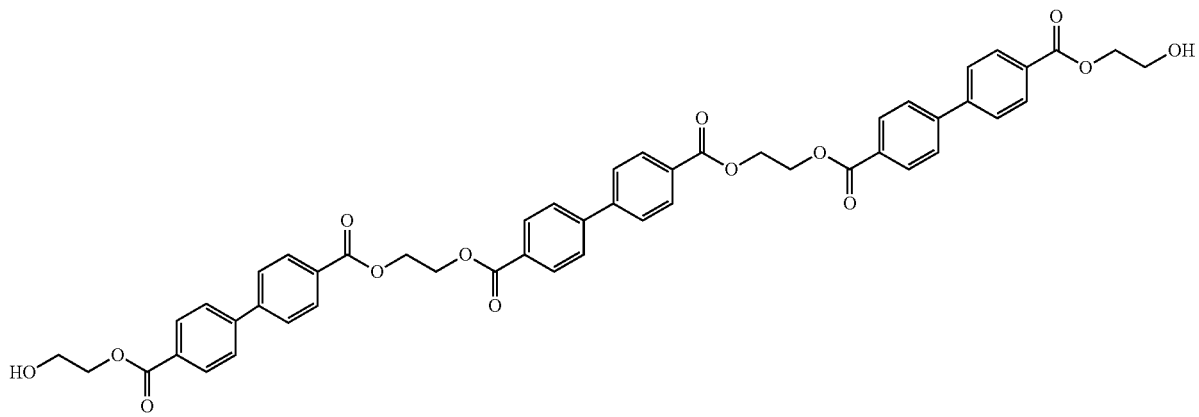

2-25

Mw: 876

<Other Additives>
(Plasticizer)

In the cellulose acetate film of the present invention, a plasticizer other than a compound represented by Formula (2) may be contained, if it is necessary to obtain the effect of the present invention.

The plasticizer is not specifically limited, however, it is preferably selected from, for example, a polycarboxylic acid ester plasticizer, a glycolate plasticizer, a phthalate plasticizer, a fatty acid ester plasticizer, a polyalcohol ester plasticizer, a polyester plasticizer and an acrylate plasticizer.

Of these, when two or more plasticizers are used, it is preferable that at least one is a polyalcohol ester plasticizer.

A polyalcohol ester plasticizer is a plasticizer which is constituted of an ester of an aliphatic polyalcohol of divalent or more and a monocarboxylic acid, and it preferably has an aromatic ring or a cycloalkyl ring in the molecule, it is preferably an ester of an aliphatic polyalcohol having a valence of 2-20.

The polyalcohol preferably used in the present invention is expressed by following Formula (a).

$$R_{11}-(OH)_n \qquad \text{Formula (a)}$$

wherein, $R_{11}$ represents an organic group having a valence of n, n represents an integer of two or more. The OH group means an alcoholic or a phenolic hydroxyl group.

As examples of a preferable polyalcohol, for example, the following compounds may be listed, however, the present invention is not limited thereto.

Examples of a preferable polyalcohol include: adonitol, arabitol, ethylene glycol diethylene glycol, triethylene glycol, tetraethylene glycol, 1,2-propanediol, 1,3-propanediol, dipropylene glycol, tripropylene glycol, 1,2-butanediol, 1,3- butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, aorbitol, trimethylolpropane, trimethylolethane and xylitol.

Specifically, triethylene glycol, tetraethylene glycol, dipropylene glycol, tripropylene glycol, sorbitol, trimethylol propane and xylitol are preferable.

The monocarboxylic acid to be used in the polyalcohol ester is not specifically limited, and a known aliphatic monocarboxylic acid, an alicyclic monocarboxylic acid and an aromatic monocarboxylic acid may be employed. Specifically, an aliphatic monocarboxylic acid and an aromatic monocarboxylic acid are preferable, since moisture permeation is reduced and retainability is improved.

Examples of a preferable monocarboxylic acid will listed below, but the present invention is not limited thereto.

A straight or branched chain carboxylic acid having 1 to 32 carbon atoms is preferably employed. The number of carbon, atoms is more preferably 1 to 20, and specifically preferably 1 to 10. The use of acetic acid is preferable for raising the compatibility with a cellulose ester, and the mixing of acetic acid wife another carboxylic acid is also preferable.

As the preferable aliphatic monocarboxylic acid, saturated aliphatic acids such as acetic acid, propionic acid, butyric acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated aliphatic acids such, as undecylenic acid, oleic acid, sorbic acid, linolic add, linolenic acid and arachidonic acid, can be exemplified.

Examples of preferable aliphatic carboxylic acid include cyclopentane carboxylic acid, cyclohexane carboxylic acid, cyclooctane carboxylic acid and derivatives thereof.

Examples of preferable aromatic monocarboxylic acid include ones formed by introducing 1-3 alkyl groups, alkoxy groups such as methoxy groups or ethoxy groups into the benzene ring of benzoic acid such as benzoic acid and toluic acid; and an aromatic monocarboxylic acid having two or more benzene rings such as biphenylcarboxylic acid, naphthalene carboxylic acid and tetralin carboxylic acid, and derivatives thereof, of these, benzoic add is specifically preferable.

The molecular weight of the polyalcohol ester is preferably 300 to 1500, and more preferably 350 to 750, though the molecular weight is not specifically limited. A larger molecular weight is preferable for storage ability, while a smaller molecular weight is preferable for compatibility with cellulose acetate.

The carboxylic acid to be employed in fee polyalcohol ester may be one kind or a mixture of two or more kinds of them. The OH groups in fee polyhydric alcohol may be fully esterified or a part of OH groups may be left unreacted.

Specific examples of fee polyalcohol ester will be listed below.

1

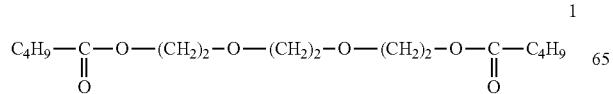

2

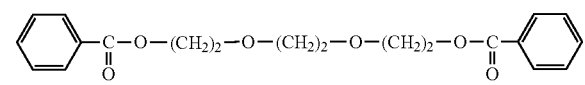

3

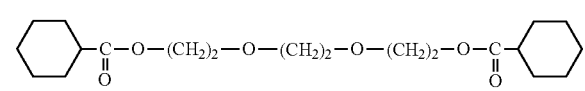

4

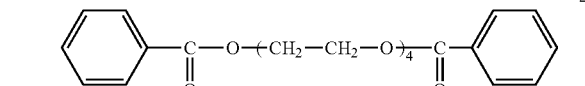

5

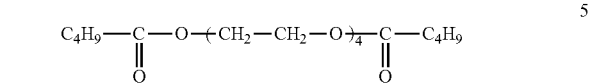

6

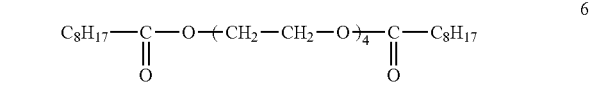

7

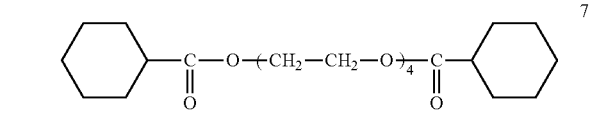

8

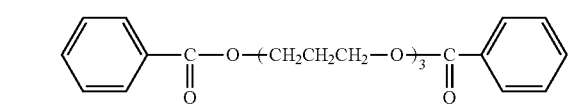

9

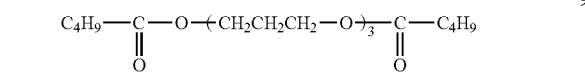

10

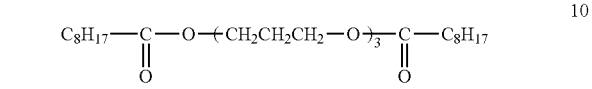

11

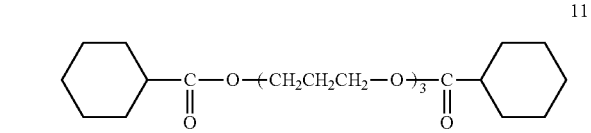

12

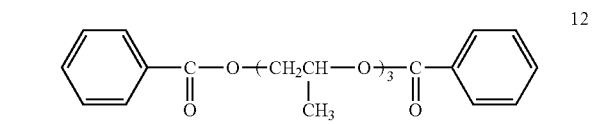

13

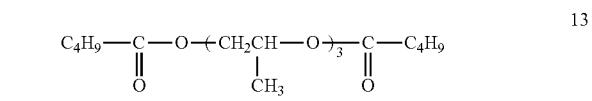

14

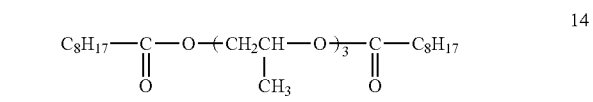

15

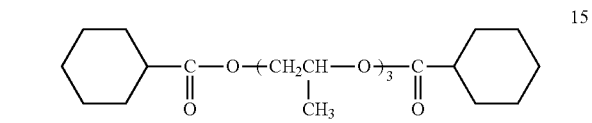

16
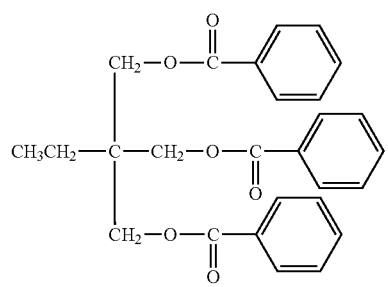
17
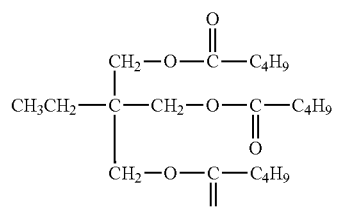
18
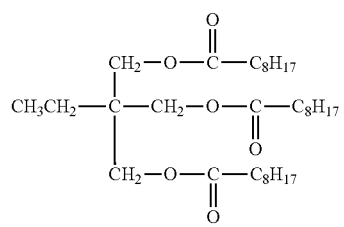
19
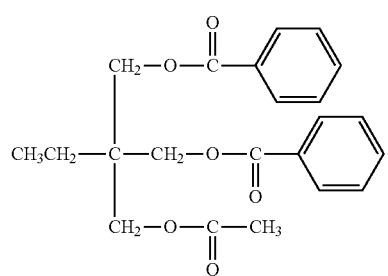
20
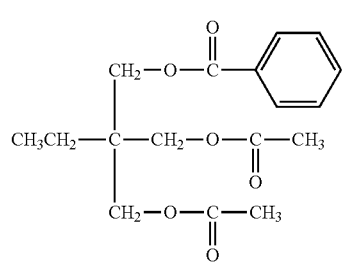
21
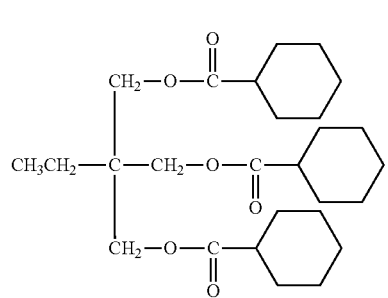
22
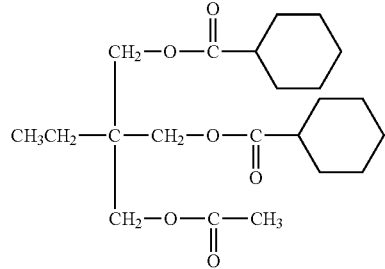
23
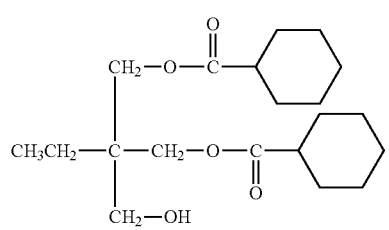
24
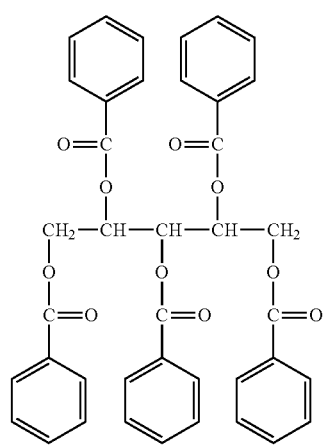
25
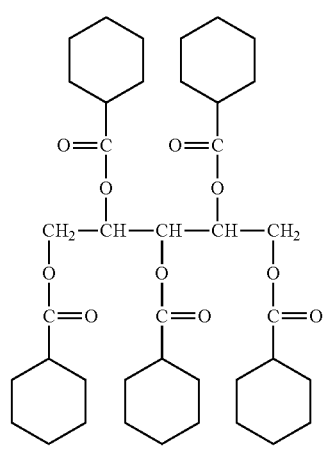

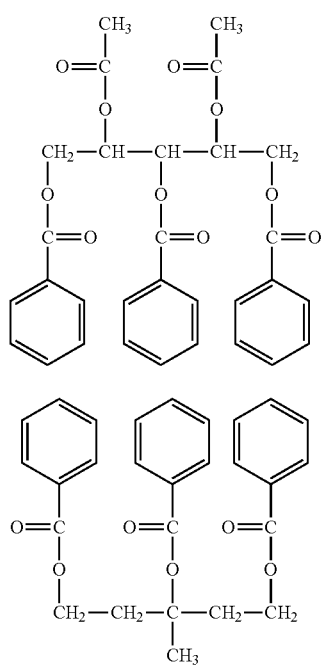

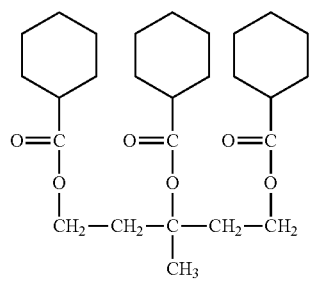

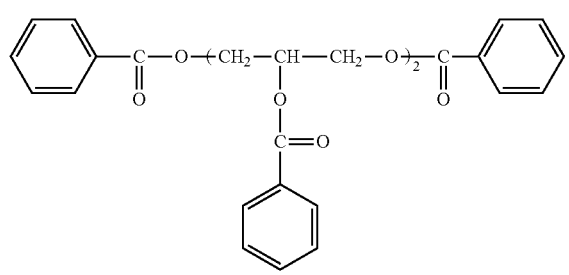

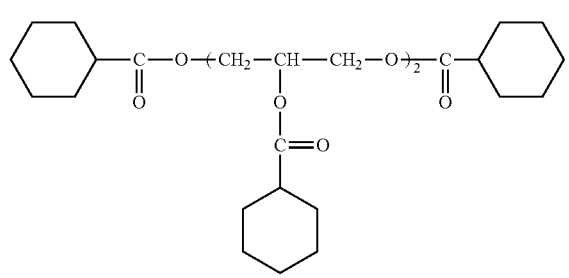

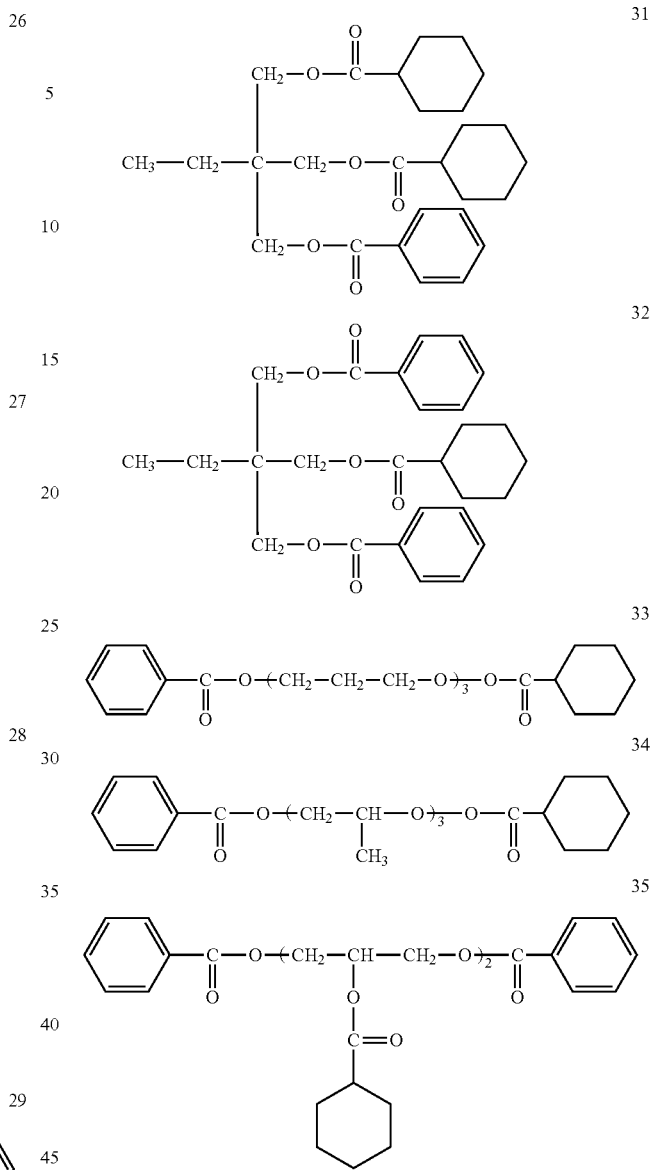

A glycolate type plasticizer is not specifically limited; however alkyl phthalyl alkyl glycolates may be preferably utilized.

Alkyl phthalyl alkyl glycolates include such as methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate and octyl phthalyl ethyl glycolate.

Examples of a phthalic acid ester plastisizer include such as diethyl phthalate, dimethoxy ethyl phthalate, dimethyl phthalate, dioctyl phthalate, dibutyl phthalate, di-2-ethylhexyl phthalate, dioetyl phthalate, dicyclohexyl phthalate and dicyclohexyl terephthalate.

Examples of a citric add ester plastisizer include such as acetyl trimethyl citrate, acetyl triethyl citrate and acetyl tributyl citrate.

Examples of a fatty acid ester type plastisizer include such as butyl oleate, methyl acetyl ricinoleate and dibutyl cebacate.

Examples of a phosphoric acid ester plastisizer include such as triphenyl phosphate, tricresyl phosphate, cresyl diphenyl phosphate, octyl diphenyl phosphate, diphenyl biphenyl phosphate, trioctyl phosphate and tributyl phosphate.

The polycarboxylic acid ester plasticizer usable in the present invention includes an ester of alcohol and a polycarboxylic acid having a valence of 2 or more, but preferably having a valence of 2 to 20. The valence of an aliphatic polycarboxylic acid is preferably 2 to 20, and the valence of an aromatic polycarboxylic acid and an alicyclic polycarboxylic acid each are preferably 3 to 20.

The polycarboxylic acid is expressed by Formula (b).

$R_{12}(COOH)_{m1}(OH)_{n1}$   Formula (b)

(wherein, $R_{12}$ represents an organic group having a valence of (m1+n1), m1 is a positive integer of two or more, and n1 is art integer of zero or more, COOH group represents a carboxyl group and OH group represents alcoholic or phenolic hydroxyl group.)

The following can be cited as an example of desirable polycarboxylic acid, however, the present invention is not limited thereto.

Examples of a polycarboxylic acid include: an aromatic polycarboxylic acid having a valence of 3 or more and its derivative, for example, trimellitic acid, trimesic acid, and pyromellitic acid; an aliphatic polycarboxylic acid, for example, succinic acid, adipic acid, azelaic acid, sebacic acid, oxalic acid, fumaric acid, maleic acid and tetrahydrophthalic acid; and an oxypolycarboxylic acid, for example, tartaric acid, tartronic acid, malic acid, and citric acid. Specifically, it is preferable to use oxypolycarboxylic acid with respect to the enhancement of retention properties.

There is no restriction in particular for an alcohol used for the polycarboxylic acid ester of the present invention, and well-known alcohol and phenol can be used.

For example, a saturated aliphatic alcohol or an unsaturated aliphatic alcohol with normal chain or branched chain having carbon atom number of 1 to 32 can be preferably used. The number of carbon atoms is more preferably from 1 to 20 and still more preferably from 1 to 10.

Moreover, an alicyclic alcohol and its derivative such as cyclopentanol and cyclohexanol and an aromatic alcohol and its derivative such as benzyl alcohol and cinnamyl alcohol can be preferably used.

When using oxypolycarboxylic acid as polycarboxylic acid, the alcoholic or phenol hydroxyl group of the oxypolycarboxylic acid may be esterified by using monocarboxylic acid. Although the following compounds can be cited as examples of a preferable monocarboxylic acid, the present invention is not limited to these.

For aliphatic monocarboxylic acids, normal or branched fatty acids having 1 to 32 carbon atoms are preferably used. The number of carbon atoms is more preferably from 1 to 20 and still more preferably from 1 to 10.

Examples of a preferable aliphatic monocarboxylic acid include saturated fatty acids such as: acetic, acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of a preferable alicyclic monocarboxylic acid include: cyclopentenecarboxylic acid, cyclohexanecarboxylic acid, cyclooctanecarboxylic acid, and derivatives thereof.

Examples of a preferable aromatic monocarboxylic acid include: benzoic acid and toluic acid, both of which have benzene ring in which an alkyl group is introduced, biphenyl carboxylic acid, naphthalenecarboxylic and tetralincarboxylic acid each having 2 or more benzene rings, and derivatives thereof. Specifically, acetic acid, propionic acid and benzoic acid are preferred.

The molecular weight of the monocarboxylic acid ester compound is not specifically limited, however, the molecular weight is preferably from 300 to 1000 and more preferably from 350 to 750. A higher molecular weight is preferable with respect to the improvement in retention properties, while a lower molecular weight is preferable with respect to reducing moisture permeability, or to improving compatibility with cellulose acetate.

The alcohol used for the polycarboxylic acid ester used for the present invention may be one kind, or a mixture of two or more kinds.

The acid value of a polycarboxylic acid ester compound used for the present invention is preferably 1 mgKOH/g or less, and more preferably 0.2 mgKOH/g or less. The acid value in the above range is preferable because the variation of retardation values due to environmental change can be suppressed.

"Acid value", as described herein, refers to the amount of potassium hydroxide in mg, which is necessary to neutralize the acid (namely a carboxyl group existing in the sample) incorporated in 1 g of a sample. The acid value is determined based on JIS K0070.

Although the examples of an specifically preferable polycarboxylic acid ester compound will be shown below, the present invention is not limited thereto.

For example, listed are: triethyl citrate, tributyl citrate, acetyltriethyl citrate (ATEC), acetyltributyl citrate (ATBC), benzoyltributyl citrate, acetyltriphenyl citrate, acetyltribenzyl citrate, diburyltartrate, diacetyldibutyl tartarate, tributyl trimellitate and tetrabutyl pyromellitate.

(Ultraviolet Absorber)

The cellulose acetate film according to the present invention may contain an ultraviolet absorber. An ultraviolet absorber is aimed to improve durability by absorbing ultraviolet rays not longer than 400 nm. Specifically, the transmittance of light at a wavelength of 370 nm is 10% or less, more preferably 5% or less, and further more preferably 2% or less.

The ultraviolet absorber utilized in the present invention is not specifically limited and includes such as an oxybenzophenone compound, a benzotriazole compound, a sarycic acid ester compound, a benzophenone compound, a cyanoacrylate compound, a triazine compound, a nickel complex salt compound and an inorganic powder.

For example listed are 5-chloro-2-(3,5-di-sec-butyl-2-hydroxyphenyl)-2H-benzotriazole, (2-2H-benzotriazole-2-yl)-6-(straight chain and branched dodecyl)-4-methylphenol, 2-hydroxy-4-benzyloxybenzophenone and 2,4-benzyloxybenzophenone; and also listed and preferably utilized are Tinuvins, such as Tinuvin 109, Tinuvin 171, Tinuvin 234, Tinuvin 326, Tinuvin 327 and Tinuvin 328, which are available on the market from BASF Japan Ltd.

Ultraviolet absorbers utilized in the present invention are preferably a benzotriazole ultraviolet absorber, a benzophenone ultraviolet absorber and a triazine t ultraviolet absorber, and specifically preferably a benzotriazole ultraviolet absorber and a benzophenone ultraviolet absorber.

In addition to these, a disc form compound such as a compound having a 1,3,5-triazine ring is preferably utilized as a UV absorber.

The cellulose acetate film according to the present invention preferably contains two or more kinds of ultraviolet absorbers.

Further, a polymer ultraviolet absorber may also be preferably utilized as an ultraviolet absorber, and polymer type ultraviolet absorbents described in JP-A No. 6-148430 are specifically preferably utilized.

As an addition method of an ultraviolet absorber, a ultraviolet absorber may be added into a dope after having been dissolved in an organic solvent, for example, alcohols such as methanol ethanol and butanol; organic solvents such as methylenechloride, methyl acetate, acetone and dioxane; and a mixed solvent thereof, or may be directly added into a dope composition.

Those insoluble in an organic solvent, such as inorganic powder, will be added into a dope after having been dispersed in an organic solvent and cellulose acetate by use of such as a dissolver or a sand mill.

The using amount of an ultraviolet absorber is not uniform depending on a type and a using condition of an ultraviolet absorbent, however, in the case of the dry layer thickness of cellulose acetate film of 30 to 200 μm, it is preferably 0.5 to 10 mass % and more preferably 0.6 to 4 mass %, based on die mass of the cellulose acetate film.

(Antioxidant)

An antioxidant is also called as a deterioration-preventing agent. When a liquid, crystal display is stored in a high temperature-high humidity condition, the cellulose acetate film may be deteriorated.

An antioxidant is preferably contained in the foregoing cellulose acetate film since an antioxidant has a function to retard or prevent, decomposition of the cellulose acetate him due to, for example, halogen contained in the residual solvent in the cellulose acetate film or a phosphoric acid contained in a phosphoric acid-containing plasticizer.

As an antioxidant, hindered phenol compounds are also preferably employed. Examples of a hindered phenol compound: 2,6-di-t-butyl-p-cresol, pentaerythityl-tetrakis[3-(3, 5-di-t-butyl-4-hydroxyphenyl)propionate], triethylene glycol-bis[3-(3-t-butyl-5-methyl-4-hydroxyphenyl) propionate], 1,6-hexanediol-bis[3-(3,5-di-t-butyl-4-hydroxyphenyl)propionate], 2,4-bis(n-octyl)-6-(4-hydroxy-3,5-di-t-butylanilino)-1,3,5-triazine, 2,2-thio-diethylene-bis[3-(3, 5-t-butyl-4-hydroxyphenyl) propionate], octadecyl-3-(3,5-di-t-butyl-4-hydroxyphenyl)propionate, N,N'-hexamethylene-bis(3,5-di-t-butyl-4-hydroxy-4-hydroxyhydrocinnamide), 1,3,5-trimethyl-2,4,6-tris(3,5-di-t-butyl-4-hydroxybenzyl)benzene and tris-(3,5-di-t-butyl-4-hydroxybenzyl)-isocyanurate.

Specifically, 2,6-di-t-butyl-p-cresol, pentaerythityl-tetrakis[3-(3,5-di-t-butyl-4-hydroxyphenyl)propionyl] and triethylene glycol-bis[3-(3-t-butyl-5-methyl-4-hydroxyphenyl) propionate] are preferred. Further, a hydrazine metal inactivation agent such as N,N'-bis[3-(3,5-di-t-butyl-4-hydroxyphenyl)propionyl]hydrazine or a phosphorus-containing processing stabilizing agent such as tris(2,4-di-t-butylphenyl)phosphite may be used in combination.

The adding amount of such a compound is preferably 1 ppm to 1.0%, and more preferably from 10 ppm to 1,000 ppm by mass based on the mass of die cellulose derivative.

<Particulates>

In order to improve a handling properly, the cellulose acetate film according to the present invention preferably contains a matting agent, for example, inorganic particles such as silicon dioxide, titanium dioxide, aluminum oxide, zirconium oxide, calcium carbonate, kaolin, talc, calcined calcium silicate, hydrated calcium silicate, aluminum silicate, magnesium silicate and calcium phosphate; and a crosslinked polymer. Of these, silicon dioxide is preferably used since it can reduce the haze of the film.

The mean diameter of primary particles of the particles is preferably 20 nm or less, more preferably from 5 to 16 nm, and specifically preferably from 5 to 12 nm.

These particles preferably exist as aggregated secondary particles having diameters of from 0.1 to 5 μm. The average particle diameter is preferably 0.1 to 2 μm and more preferably 0.2 to 0.6 μm, whereby unevenness of around 0.1 to 1.0 μm is formed on the surface of the film, which provide a moderate lubrication property to the surface of the film.

The primary particle diameter of fee particles used in the present, invention is determined via observation of the particles using a transmission electron microscope (magnification of 500000 to 2000000 times), in which 100 particles are observed to measure the particle diameters, and the average value thereof is used as the average primary particle diameter.

<Manufacturing Method of Cellulose Acetate Film>

Next, the manufacturing method of the cellulose ester film of the present invention will be explained.

In the present invention, any of a cellulose acetate film manufactured via a solution casting method or a cellulose acetate film manufactured via a melt casting method may be preferably used.

Manufacturing of the cellulose acetate film of the present invention may be performed by a process to dissolve cellulose acetate and additives in a solvent to prepare a dope, a process to east the dope on an endlessly sunning endless metal support, a process to dry the cast dope to make a web, a process to peel the web from the metal support, a process to stretch the web or to hold the width, a process to further dry the web, and a process to wind up the finished film.

A process to prepare a dope will be now described. The concentration of cellulose acetate in a dope is preferably the higher with respect to decreasing a drying load after the dope has been cast on a metal support, while filtering precision will be deteriorated due to an increased load at the time of filtering when the concentration of cellulose acetate is excessively high. The concentration to balance these is preferably 10-35 weight % and more preferably 15-25 weight %.

A solvent utilized in a dope of the present invention, one type alone or at least two types in combination may be utilized, however, a good solvent and a poor solvent for cellulose acetate are preferably utilized in combination with respect to manufacturing efficiency. A larger amount of a good solvent is preferable with respect to the dissolution of cellulose acetate.

A preferable range of a mixing ratio of a good solvent to a poor solvent is 70-98 weight % of good solvent to 2-30 weight % of a poor solvent. As a good solvent and a poor solvent, one dissolves the cellulose ester by itself alone is defined as a good solvent and one swells or can not dissolve the cellulose ester alone is defined as a poor solvent.

Therefore, a good solvent and a poor solvent may change depending on an average acetyl substitution degree of cellulose acetate.

A good solvent utilized in the present invention is not specifically limited, however, includes an organic halogen compound such as methylene chloride, dioxoranes, acetone, methylacetate and methyl acetoacetate. Methylene chloride and methyl acetate are specifically preferable.

Further, a poor solvent utilized in the present invention is not specifically limited, however, such as methanol, ethanol, n-butanol, cyclohexane and cyclohexanone are preferably utilized. Further, a dope is preferably contains 0.01-2 mass % of water.

The solvent removed from the film by drying in the film forming process is recovered and reused as the solvent used for dissolving a cellulose ester.

In the recovered solvent, a small amount of, for example, a plasticizer, a UV absorber, a polymer component or a monomer component may be contained. The solvent can be preferably used even, when these materials are contained, or, alternatively, the solvent may be purified, if necessary, to reuse.

As a dissolution method of cellulose ester at the time of preparation of the dope described above, a general method can be employed. By a combination of heating and increased pressure, it is possible to heat up to a temperature higher than the boiling point of the solvent under an ordinary pressure.

It is preferable to dissolve the cellulose ester while stirring, by heating up to a temperature higher man the boiling point of the solvent under an ordinary pressure but in the temperature range in which die solvent does not boil under the increased pressure, because generation of a granular insoluble residue, which, is called as gel or flocculates, is prevented.

Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside, and for example, jacket type equipment is preferable with, respect to easy temperature control.

Heating temperature with addition of a solvent is preferably the higher in view of solubility of cellulose ester; however, productivity may be deteriorated due to Increase of a required pressure when the heating temperature is excessively high.

The heating temperature is preferably 45-120° C. more preferably 60-110° C. and furthermore preferably 70-105° C. Further, the pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when fee absolute filtering precision is excessively small.

Therefore, fee absolute filtering precision of a filter medium is preferably not larger than 0.008 mm, more preferably 0.001-0.008 mm and furthermore preferably 0.003-0.006 mm.

The material of a filter medium is not specifically limited and an ordinary filter medium can be utilized, however, a filter medium made of plastic such as polypropylene and Teflon (a registered trade mark) and a filter medium made of metal such as stainless steel are preferable because of such as no release of fiber of a filter medium.

It is preferable to eliminate and reduce impurities and particularly foreign matter causing a bright spot defect, having been contained in cellulose ester as a raw material, by filtration.

Foreign, matter causing bright spot defects means a spot (foreign matter) which is visible due to light leak, when two sheets of polarizing plates, between which an optical film is placed, are arranged in a crossed nicols state, and light is irradiated from one of the polarizing plate side to be observed from the other polarizing plate side. The number of bright spots having a diameter of not less than 0.01 mm is preferably not more than 200 spots/cm$^2$.

The number of bright spots having a diameter of not less than 0.01 mm is more preferably not more than 100 spots/cm$^2$, further more preferably not more than 50 spots/cm$^2$, still more preferably 0-10 spots/cm$^2$. Further, the number of a bright spot defect of not larger than 0.01 mm is also preferably the smaller.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures between before and after filtering (referred to as a pressure difference).

The preferable temperature is 45 to 120° C., more preferably 45 to 70° C. and furthermore preferably 45 to 55° C.

Filter pressure is preferably the lower. The filter pressure is preferably not higher than 1.6 MPa, more preferably not higher than 1.2 MPa and furthermore preferably not higher than 1.0 MPa.

Casting of a dope will now be explained.

A metal support in a casting process is preferably those the surface of which is mirror finished, and a stainless steel belt or a drum made of castings, the surface of which is plating finished, is utilized.

The cast width can be set to 1-4 m. The surface temperature of a metal support in a cast process is from −50° C. to a temperature lower than the boiling point of a solvent. It is preferable the temperature is the higher since a drying speed of a web can be set faster; however, excessively high temperature may sometimes cause foaming of a web or deterioration of flatness.

The support temperature is preferably 0 to 55° C. and more preferably 25 to 50° C. It is also a preferable method to make a web gelled by cooling and to peel off the web from a drum while the web contains a larger amount of residual solvent.

The method, to control the temperature of a metal support is not specifically limited; however, there are a method to blow a hot wind or a cold wind on the web and a method to make hot water contact the rear side of a metal plate. A method to utilize hot water is preferable because time required to make a metal support become a constant temperature is short due to more efficient heat conduction, in the case of employing a hot wind, a wind of a temperature higher than the aimed, temperature may be employed.

To provide a good flatness of a cellulose acetate film, the residual, solvent amount at the time of peeling off a web from a metal, support is preferably 10 to 150 mass %, more preferably 20 to 40 mass % or 60 to 130 mass % and specifically preferably 20 to 30 mass % or 70 to 120 mass %.

In the present invention, a residual solvent amount is defined by the following equation.

$$\text{Residual solvent amount (mass \%)} = \{(M-N)/N\} \times 100$$

Herein, M is a weight of a sample picked at an arbitrary time during or after manufacturing of a web or film and N is a weight after heating M at 115° C. for 1 hour.

Further, in a drying process of a cellulose acetate film, a web is preferably peeled off from a metal support and further dried to make a residual solvent amount of not more than 1 mass %, more preferably not more than 0.1 mass % and specifically preferably 0-0.01 mass %.

In a film drying process, a roll drying method (in which a web is dried while being alternately passed through many rolls which are arranged up and down) or a method to dry a web while being transported by a tenter method will be applied.

To prepare cellulose acetate film of the present invention, it is specifically preferable mat a web is stretched in the width direction (the lateral direction) by means of a tenter method to grip fee both edges of fee web by such as clips. The peeling tension is preferably 300 N/m or less.

A means to dry a web is not specifically limited, and it can be generally performed by such as a hot wind, infrared rays, a heat roll and microwaves, however, preferably performed by a hot wind in view of convenience.

A drying temperature in a drying process of a web is preferably raised step-wise in a range of 40 to 200° C.

The layer thickness of fee cellulose acetate film is not specifically limited; however, a layer thickness of 10 to 200 μm is applied. The layer thickness is specifically preferably 10 to 100 μm and furthermore preferably 20 to 60 μm.

The cellulose acetate film of fee present invention has a width of 1 to 4 m. The width is preferably 1.4 to 4 m and specifically preferably 1.6 to 3 m. When the width exceeds 4 m, the transportation becomes difficult.

In the cellulose acetate film relating to the present invention, although the needed retardation becomes different hi accordance with the required optical compensation effect, from the viewpoints of utilization of the high retardation exhibiting property, an in-plane direction retardation Ro defined by following Formula (I) is preferably 30 nm or more, more preferably in the range of 30 to 200 nm, and still more preferably in die range of 30 to 90 nm, and a thickness direction retardation Rt defined by Equation (II) is preferably 70 nm or more, and more preferably in the range of 70 to 300 nm.

$$Ro=(nx-ny)\times d \quad \text{Equation (I)}$$

$$Rt=\{(nx+ny)/2-nz\}\times d \quad \text{Equation (II)}$$

(in the formula, nx is a film in-plane refractive index in the slow axis direction, ny is a film in-plane refractive index in the fast axis direction, nz is a refractive index in the film thickness direction, and d is a thickness (nm) of a film.)

Samples were cut out with a size of 35 mm×35 mm from the obtained films, and moisture conditioned under an ambience of 25° C. and 55% RH for two hours. Retardation values were measured in a vertical direction by the use of an automatic birefringence analyzer (KOBRA-21ADH manufactured by Oji Scientific Instruments) at a wavelength of 590 nm for each of the samples, and also retardation values were measured with the same ways on the condition that the film surface of each sample was slanted, then retardation, values were calculated from extrapolation values of these measured retardation values.

The method to control the retardation values is not specifically limited, however, a method to control via a stretching treatment is commonly conducted.

In order to obtain the retardation values Ro and Rt desired in the present invention, it is preferable that the cellulose acetate film has die constitution of the present invention and further, is subjected to refractive index control by means of control of conveyance tension or stretching.

The retardation value ran be varied, by increasing or decreasing the tension, along the longitudinal direction.

It is also possible to perform uniaxial stretching or sequential or simultaneous biaxial stretching in the longitudinal direction of the film (the cast direction) and in the direction perpendicular thereto hi the film plane, namely, in the width direction in order to vary the retardation values.

The stretching ratios in the biaxial directions perpendicular to each other are preferably set to finally 0.8 to 1.5 times in the cast direction and 1.1 to 2.5 times in the width direction, and more preferably set to 0.8 to 1.0 times in the cast direction and 1.2 to 2.0 times in the width direction.

The stretching temperature is preferably 120° C. to 200° C., more preferably 150° C. to 200° C., still more preferably higher than 150° C. and not higher than 190° C.

It may be preferable to stretch a film under the condition where the content of the residual solvent in the film is 20 to 0%, and more preferably 15 to 0%.

More concretely, the film is preferably stretched under the condition that the content of the residual solvent is 11% at 155° C., or the content of the residual solvent is 2% at 155° C. Otherwise, the content of the residual solvent is 11% at 160° C., or the content of fee residual, solvent is lower than 1% at 160° C.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edges of a web with clips or pins and widening the intervals between clips and pins toward the proceeding direction, a method to stretch by widening similarly along the width direction, or a method to stretch in the both of longitudinal and width directions by simultaneously widening along the longitudinal and width directions. Of course, these methods may be used in combination.

In a so-called tenter method, it is preferable that a smooth stretching can be performed by driving the clip portion by a linear drive method which reduces risk to such as rupture.

It is preferable to perform the width holding or stretching in the width direction by a tenter, which may be either a pin tenter or a clip tenter.

The slow axis or the fast axis of the cellulose acetate film of the present invention preferably is present in a film plane and θ1 is preferably not less than −1° and not more than +1°, and more preferably not less than −0.5° and not more than +0.5°, provided that θ1 represents the angle against the casting direction.

This θ1 can be defined as an orientation angle, and measurement of θ1 can be performed by use of automatic birefringent meter KOBRA-21ADH (Oji Scientific Instrument). To satisfy the above-described relationships by θ1 can contributes to obtain a high luminance and to restrain or prevent light leak, and to obtain faithful color reproduction in a color liquid display.

<Physical Properties of Cellulose Acetate Film>

The moisture permeability of the cellulose, acetate film according to the present invention is preferably 300 to 1,800 $g/m^2 \cdot 24$ h, more preferably 400 to 1,500 $g/m^2 \cdot 24$ h and specifically preferably 40 to 1300 $g/m^2 \cdot 24$ h at 40° C., 90% RH. The moisture permeability can be measured according to a method described in JIS Z 0208.

The elongation percentage of the cellulose acetate film according to the present invention is preferably 10 to 80% and more preferably 20 to 50%.

The visible light transmittance of the cellulose acetate film according to the present invention is preferably not less than 90% and more preferably not less than 93%.

The haze of the cellulose acetate film according to the present invention is preferably less than 1% and specifically preferably 0 to 0.1%.

<Polarizing Plate>

The cellulose acetate film of the present invention can be used in a polarizing plate and a liquid crystal display device employing the same.

A polarizing plate of the present invention is characterized in that it is a polarizing plate constituted of a polarizer, pasted with the aforesaid cellulose acetate film according to the present invention on at least one surface. A liquid crystal display device of the present invention is characterized in that a polarizing plate according to the present invention is pasted up on at least one surface of a liquid crystal cell via an adhesive layer.

The polarizing plate of the present invention can be prepared by an ordinary method. The cellulose acetate film according to the present invention, the polarizer side of which being subjected to an alkaline saponification treatment, is preferably pasted up on at least one surface of a polarizer which has been prepared by immersion stretching in an iodine solution by use of a completely saponificated type polyvinyl alcohol aqueous solution.

On the other surface, said cellulose acetate film may be utilized or another film may be utilized.

For example, a cellulose ester film available on the market (such as Konica Minolta TAG KC8UX, KC5UX, KC8UCR3, KC8UCR4, KC8UCR5, KC8UY, KC4UY, KC4UE, KC8UE, KC8UY-HA, KC8UX-RHA, KC8UXW-RHA-C, KC8UXW-RHA-NC, and KC4UXW-RHA-NC manufactured by Konica Minolta Opto. Inc.) is also preferably utilized.

Onto the polarizing plate of the viewer's side of a display unit, it is desirable to provide an antireflection layer, an antistatic layer, an antifouling layer, or a back coat layer besides an antiglare layer or a clear hard coat layer.

A polarizer as a primary constitution element is an element to pass light of a polarized wave plane of a predetermined direction, and a typical polarizer known at present is polyvinyl type polarizing film, which includes polyvinyl alcohol film dyed with iodine and one dyed with dichroic dye.

As a polarizer, utilized is one in which a polyvinyl alcohol aqueous solution is cast, and the cast film is uniaxially stretched and dyed, or is uniaxially stretched after having been dyed, preferably followed by being subjected to a durability treatment with a boron compound. The layer thickness of a polarizer is preferably 5 to 30 µm and specifically preferably 10 to 20 µm.

Further, ethylene modified polyvinyl alcohol which is described in such as JP-A 2003-248123 and JP-A 2003-342322 and has an ethylene unit content of 1 to 4 mol %, a polymerization degree of 2,000 to 4,000 and a saponification degree of 99.0 to 99.99 mol % is also preferably utilized.

Among them, ethylene modified polyvinyl alcohol having a hot water breaking temperature of 66 to 73° C. is preferably utilized.

A polarizer utilizing this ethylene modified polyvinyl alcohol film is excellent in polarizing ability and durability, as well as exhibits few color spottiness, and is specifically preferably applied in a large size liquid crystal display device.

A polarizer prepared in the above manner, generally on the both surface or one surface of which protective film is pasted up, is utilized as a polarizing plate. An adhesive employed at the time of paste up includes a PVA type adhesive or an urethane type adhesive, however, among them preferably utilized is a PVA type adhesive.

<Liquid Crystal Display>

By using a polarizing plate pasted with a cellulose acetate film of the present invention for a liquid crystal display, various kinds of the liquid crystal displays of the present invention excellent in visibility can be produced.

Specifically, it is preferable that the cellulose acetate film of the present invention also has a function of a retardation film, whereby it can be used for liquid crystal displays with various drive modes, such as STN, TN, OCB, HAN, VA (MVA, PVA), IPS, and OCR It is preferable to use for a VA (MVA, PVA) mode liquid crystal display.

Especially, even if a liquid crystal display has a large screen more than 30 size, it is possible to obtain a liquid crystal display in which there are few environmental variations, light leakage is reduced, and visibility, for example, with respect to color tone unevenness and front contrast is excellent.

EXAMPLES

Hereafter, the present invention will be explained with referring to examples, however, the present invention is not limited thereto.

Example 1

Production of Cellulose Acetate Film 101

<Particle Dispersion Liquid 1>

| | |
|---|---|
| Particle (Aerosil R972V manufactured by Japan Aerosil) | 11 parts by mass |
| Ethanol | 89 parts by mass |

The substances listed above were agitated and mixed by a dissolver for 50 minutes and then dispersed by the use of Manton Gaulin.

<Particle Addition Liquid 3>

The particle dispersion Liquid 1 was slowly added into a solution tank storing methylene chloride, while being agitated sufficiently. Further, the solution was dispersed by an at-righter so that the particle size of secondary particles became a predetermined size. Tire resultant solution was filtered by the use of Fine Met NF manufactured by Nippon Seisen Co., Ltd., whereby Particle addition liquid 1 was prepared.

| | |
|---|---|
| Methylene chloride | 99 parts by mass |
| Particle dispersion liquid 1 | 5 parts by mass |

A main dope liquid of the following composition was prepared. First, methylene chloride and ethanol were added to a pressure solution tank. Cellulose acetate (hawing acetyl substitution degree of 2.45, and Mw of 180,000) was supplied into the pressure solution tank storing a solvent while being agitated. Further, it was dissolved completely while being heated and agitated. The resultant liquid was filtered by the use of Azumi filter paper No. 244 manufactured by Azumi Filter Paper Co., Ltd., whereby the main dope liquid was prepared.

<Composition of the Main Dope Liquid>

| | |
|---|---|
| Methylene chloride | 340 parts by mass |
| Ethanol | 64 parts by mass |
| Cellulose acetate (having acetyl substitution degree of 2.45, and Mw of 180,000) | 100 parts by mass |
| Compound represented by Formula (1) (Content was shown in Table 1) | 8 parts by mass |
| Ester compound represented by Formula (2) 2-25 | 4 parts by mass |
| Particle addition liquid 1 | 1 part by mass |

The above substances were put into a sealed container and dissolved while being agitated whereby a dope liquid was prepared. Subsequently, by the use of an endless belt type casting apparatus, the dope liquid was uniformly cast on a stainless steel belt support at the temperature of 33° C. with, a 1500 mm width. The temperature of the stainless steel belt was controlled at 30° C.

The solvent was evaporated on the stainless belt support until the remaining solvent amount in the east film became 75%, and then the cast film was peeled from fire stainless steel belt support with a peeling force of 130 N/m.

The peeled cellulose acetate film was stretched 42% in the width direction by the use of a tenter under the application of heat of 165° C. The residual solvent at the time of starting the stretching was 10%.

Subsequently, the drying of the cellulose acetate film was completed while the cellulose acetate film was conveyed using many rollers through a drying zone. The drying temperature was 130° C. and the conveying tension was 100 N/m.

As mentioned above, Cellulose acetate film 101 having a dry thickness of 40 μm was obtained.

Cellulose acetate films 102 to 121 were produced in fee same manner as described tor Cellulose acetate film 101, except that the dope compositions and the producing conditions were changed to those given in Table 1.

In Table 1, TPP: triphenyl phosphate and EPEG: ethylphthalyl ethyl glycolate.

<<Evaluation>>

Each of obtained samples was subjected to measurements of retardation values at each wavelength, haze values in a moisture-heat durability test, and the dissolution to a saponification liquid. The results were summarized in Table 2.

(Measurement of Retardation Ro and Rt)

Samples were cut out with a size of 35 mm×35 mm from the obtained films, and moisture conditioned under an ambience of 25° C. and 55% RH for two hours. Retardation values were measured in a vertical direction by the use of an automatic birefringence analyzer (KOBRA-21ADH manufactured by Oji Scientific Instruments) at a wavelength of 590 nm for each of the samples, and also retardation values were measured with die same ways on the condition that the film surface of each sample was slanted, then retardation values were calculated from extrapolation values of these measured retardation values.

(Haze in Moisture-heat Durability Test)

The remainder of (Total haze after the film was exposed to an environment of 60 and 90% for 1000 hours) subtracted by (Total haze before the exposure) was measured and used as evaluation of haze. The haze was measured according to JIS K-7136 using a haze meter (NDH2000 manufactured by Nippon Denshoku).

A: The remainder was 0.1 or less.

B: The remainder is 0.1 to 0.2.

C: The remainder is 0.2 to 0.5.

D: The remainder is 0.5 or more.

(Dissolution to Saponification Liquid)

<Mass Change after Saponification>

Before measuring the mass, a film before alkaline saponification was subjected to moisture conditioning at 23° C. and 55% for 24 hours. Tire mass was measure after the film was saponified, washed with water aid moisture conditioned at 23° C. and 55% for 24 hours. Alkaline saponification treat-

TABLE 1

| Cellulose acetate film No. | Cellulose acetate Acetyl substitution degree | Mass parts | Exemplified compound represented by Formula (1) Compound | Mixing ratio | Mass parts | Average log P value | Exemplified ester compound represented by Formula (2) Compound | Mass parts | Remarks |
|---|---|---|---|---|---|---|---|---|---|
| 101 | 2.45 | 100 | a1/a2/a3/a4 | 58/23/15/4 | 8 | 12.6 | 2-25 | 4 | Comparative |
| 102 | 2.45 | 100 | a1/a2/a3/a4 | 43/27/20/10 | 8 | 11.9 | 2-25 | 4 | Inventive |
| 103 | 2.45 | 100 | a1/a2/a3/a4 | 25/20/22/33 | 8 | 10.5 | 2-25 | 4 | Inventive |
| 104 | 2.45 | 100 | a1/a2/a3/a4 | 13/45/29/13 | 8 | 11 | 2-25 | 4 | Inventive |
| 105 | 2.45 | 100 | a1/a2/a3/a4 | 2/25/57/16 | 8 | 10 | 2-25 | 4 | Inventive |
| 106 | 2.45 | 100 | a1/a2/a3/a4 | 0/13/44/43 | 8 | 9.2 | 2-25 | 4 | Inventive |
| 107 | 2.45 | 100 | — | — | — | — | 2-25 | 4 | Comparative |
| 108 | 2.18 | 100 | b1/b2/b3/b4 | 74/12/7/7 | 7.5 | −1.2 | 2-21 | 6 | Comparative |
| 109 | 2.18 | 100 | b1/b2/b3/b4 | 23/36/24/17 | 7.5 | −1.3 | 2-21 | 6 | Inventive |
| 110 | 2.05 | 100 | c1/c2/c3/c4 | 47/29/14/10 | 9 | 14.9 | 2-20 | 4.5 | Comparative |
| 111 | 2.05 | 100 | c1/c2/c3/c4 | 22/35/24/19 | 9 | 13.6 | 2-20 | 4.5 | Inventive |
| 112 | 2.05 | 100 | c1/c2/c3/c4 | 5/27/39/29 | 9 | 12.3 | 2-20 | 4.5 | Inventive |
| 113 | 2.45 | 100 | d1/d2/d3 | 67/22/11 | 7.5 | 2.3 | 2-23 | 6 | Comparative |
| 114 | 2.45 | 100 | d1/d2/d3 | 31/55/14 | 7.5 | 1.8 | 2-23 | 6 | Inventive |
| 115 | 2.45 | 100 | e1/e2/e3/e4 | 77/13/10/0 | 5 | 7.5 | 2-1 | 6 | Comparative |
| 116 | 2.45 | 100 | e1/e2/e3/e4 | 12/34/29/25 | 5 | 4.8 | 2-1 | 6 | Inventive |
| 117 | 2.45 | 100 | f1/f2/f3/f4 | 90/5/3/2 | 12 | −1.4 | 2-13 | 3 | Comparative |
| 118 | 2.45 | 100 | f1/f2/f3/f4 | 19/25/38/18 | 12 | −1.6 | 2-13 | 3 | Inventive |
| 119 | 2.45 | 100 | g1 | 100 | 7.5 | 8.1 | 2-18 | 6 | Comparative |
| 120 | 2.45 | 100 | — | — | — | — | TPP | 6 | Comparative |
| 121 | 2.45 | 100 | — | — | — | — | EPEG | 6 | Comparative | ment was carried out by immersing the film in a 1.5 mol/L sodium hydroxide solution at 40° C. for 60 seconds.

The ratio of change of the mass after saponification treatment and washing (b) against the mass before saponification treatment (a) was obtained by following Formula (w).

$$((b-a)/a) \times 100 \geq 0 (\%) \quad \text{Formula (w)}$$

a: mass of the film before saponification treatment
b: mass of the film after saponification treatment and washing $$((b-a)/a) \times 100 \geq 0 (\%) \quad A:$$

$$((b-a)/a) \times 100 \geq 0 (\%) \quad B:$$

<White Foreign Substance in the Saponification Liquid>

The saponification liquid after continuous alkaline saponification for 24 hours under the condition mat the immersion was conducted at 40° C. in a 1.5 mol/L sodium hydroxide solution was visually observed. When white foreign substance was observed, visual observation of the film after saponification was also carried out.

A: No white foreign substance was observed in the saponification liquid.

B: White foreign substance was observed in five saponification liquid, however, no adhesion of the white foreign substance to the film was observed.

C: A large amount of white foreign substance was observed in the saponification liquid, and, adhesion of the white foreign substance to the film was also observed.

TABLE 2

| Cellulose acetate film No. | Retardation Ro (nm) | Retardation Rth (nm) | Moisture-heat durability test Δ haze Before and after 1000 H test | Dissolution to saponification liquid Mass change after saponification | Dissolution to saponification liquid White foreign substance in saponification liquid | Remarks |
|---|---|---|---|---|---|---|
| 101 | 75 | 220 | D | A | A | Comparative |
| 102 | 73 | 215 | C | A | A | Inventive |
| 103 | 70 | 207 | B | A | A | Inventive |
| 104 | 70 | 195 | A | A | A | Inventive |
| 105 | 69 | 191 | A | A | A | Inventive |
| 106 | 65 | 185 | A | A | A | Inventive |
| 107 | 80 | 225 | D | B | C | Comparative |
| 108 | 45 | 170 | D | A | B | Comparative |
| 109 | 53 | 185 | B | A | B | Inventive |
| 110 | 49 | 198 | D | A | A | Comparative |
| 111 | 53 | 206 | B | A | A | Inventive |
| 112 | 57 | 224 | A | A | A | Inventive |
| 113 | 50 | 98 | D | A | B | Comparative |
| 114 | 53 | 105 | C | A | B | Inventive |
| 115 | 45 | 114 | D | A | A | Comparative |
| 116 | 51 | 123 | A | A | B | Inventive |
| 117 | 53 | 157 | D | A | B | Comparative |
| 118 | 58 | 172 | A | A | B | Inventive |
| 119 | 43 | 111 | D | A | A | Comparative |
| 120 | 53 | 126 | D | B | C | Comparative |
| 121 | 47 | 109 | D | B | C | Comparative |

From the above table, it was found that the cellulose acetate film of the present invention has sufficient retardation values, and exhibits small increase of haze in a moisture-heat durability test and small dissolution of the film or the additive into the saponification liquid.

Example 2

Preparation of Polarizing Plates 101 to 121

A polyvinyl alcohol film having a thickness of 120 μm was uniaxially stretched (temperature: 110° C. stretching ratio: 5 times).

The film was immersed in an aqueous solution of 0.075 g iodine, 5 g potassium iodide, and 100 g water tor 60 seconds, and then immersed in a 68° C. aqueous solution of 6 g potassium iodide, 7.5 g boric acid and 100 g water. The film was washed and dried to obtain a polarizer film.

Next the polarizer film and each of the cellulose acetate films 101 to 121 of the present invention were pasted onto the front side and a Konica Minolta TAG KC4UY (cellulose ester film manufactured by Konica Minolta Opto. Inc. was pasted on the back side in accordance with the following steps 1 to 5, whereby Polarizing plates 101 to 121 were prepared.

Step 1: Each of Cellulose acetate films 101 to 121 was immersed for 90 seconds in 2 mol/L of sodium hydroxide solution at 60° C. and then washed and dried, whereby Cellulose acetate films 101 to 121 each of the sides of which to be pasted to a polarizer film was saponified were obtained. The KC4UY films to be used for the back sides were also subjected to a saponification treatment.

Step 2: The polarizer film was immersed in a tank of polyvinyl alcohol adhesive having a solid content of 2 mass % for 1 to 2 seconds.

Step 3: Excess adhesive attached to the polarizer film in Step 2 was gently wiped off and then the polarizer film was placed on each of Cellulose acetate films 101 to 121 which were processed in Step 1.

Step 4: Each of the cellulose acetate films 101 to 121 and the polarizer film which were stacked in Step 3, and a cellulose ester films on the back side were pasted together at a pressure of 20-30 N/cm$^2$ and a conveyance speed of approximately 2 m/minute.

Step 5: The samples each of which was obtained by stacking a polarizer film, one of Cellulose acetate films 101 to 121, and Konica Minolta TAG KC4UY in Step 4 were dried for 2 minutes in a dryer at 80° C., whereby Polarizing plates 101 to 321 corresponding to Cellulose acetate films 101 to 121, respectively, were prepared.

<Production of Liquid Crystal Display>

A liquid crystal panel to perform viewing angle measurement was produced as fellows, and the characteristics as a liquid crystal display were evaluated.

The polarizing plates preliminarily pasted on both sides of 40 type displays BRAVIA X1 manufactured by SONY were removed, and the polarizing plates 101 to 121 which were produced as mentioned above were respectively pasted onto both sides of glass surfaces of the liquid crystal cells.

At this time, die polarizing plates were pasted in such a manner that the plane of the cellulose acetate film of the present invention became the liquid crystal cell side and the absorption axis of which was directed to the same direction as die direction of the absorption axis of the preliminarily pasted polarizing plate, whereby Liquid crystal displays 101 to 121 respectively corresponding to Polarizing plates 101 to 121 were produced.

These liquid crystal displays were evaluated in terms of a viewing angle and visibility, and it was confirmed that the liquid crystal displays installed with the polarising plates employing the cellulose acetate films of the present invention exhibited wide viewing angles and excellent visibility free from uneven contrast or uneven color hue.

What is claimed is:

1. A cellulose acetate film comprising:
a cellulose acetate having an acetyl substitution degree of 2.0 to 2.5; and
at least one compound having a structure represented by Formula (1) and having a mixing ratio of a component exhibiting m=0:a component exhibiting m>0 of 45:55 through 0:100, a content of the compound being 5 to 15% by mass based on a mass of cellulose acetate, $$(HO)_m\text{-}G\text{-}(X^1\text{—}R^1)_n \qquad \text{Formula (1)}$$

wherein
G represents a residue of a mono- or di-saccharide, $X^1$ represents —O—, $R^1$ represents —CO—$R^2$, $R^2$ represents an aliphatic group or an aromatic group, m represents a total number of a hydroxyl group directly bonded to the mono- or di-saccharide, n represents a total number of OR' group directly bonded to the mono- or di-saccharide, $3 \leq m+n \leq 8$, and n is not zero,
wherein
the compound represented by Formula (1) exhibits an average log P value of 7.5 or more,
wherein
an in-plane retardation Ro of the film defined by the following Equation (I) is in the range of 30 to 200 nm, and a thickness direction retardation Rt of the film defined by the following Equation (II) is in the range of 70 to 300 nm, $$Ro=(nx-ny)\times d, \qquad \text{Equation (I)}$$

$$Rt=\{(nx+ny)/2-nz\}\times d, \qquad \text{Equation (II)}$$

and in the equations, nx is an in-plane refractive index in the slow axis direction of the film, ny is an in-plane refractive index in the fast axis direction perpendicular to the slow axis direction of the film, nz is a refractive index in the film thickness direction of the film, and d is a thickness (nm) of the film,
wherein
the cellulose acetate film comprises 5 to 15% by mass based on the mass of the cellulose ester of a compound represented by Formula (1) and exhibiting an average log P value of 7.5 or more.

2. The cellulose acetate film of claim 1, wherein the mono- or di-saccharide represented by G in Formula (1) is a pyranose ring, a furanose ring or both of the pyranose ring and the furanose ring.

3. The cellulose acetate film of claim 1, wherein the at least one compound is a mix of components having the structure represented by Formula (1) and having different m values.

4. A polarizing plate having the cellulose acetate film of claim 1 on at least one surface of a polarizer.

5. A liquid crystal display device having the polarizing plate of claim 4 on at least one surface of a liquid crystal cell.

* * * * *